(12) United States Patent
Zuckerman et al.

(10) Patent No.: US 8,862,771 B2
(45) Date of Patent: Oct. 14, 2014

(54) DISTRIBUTED PUSH-TO-STORAGE SYSTEM WITH REDUNDANCY

(76) Inventors: Gal Zuckerman, Petah-Tikva (IL); Gil Thieberger, Kiryat Tivon (IL)

(*) Notice: Subject to any disclaimer, the term of this patent is extended or adjusted under 35 U.S.C. 154(b) by 1361 days.

(21) Appl. No.: 12/340,684

(22) Filed: Dec. 20, 2008

(65) Prior Publication Data

US 2009/0106425 A1    Apr. 23, 2009

Related U.S. Application Data

(63) Continuation of application No. 12/305,957, filed as application No. PCT/IB2007/052392 on Jun. 20, 2007, now Pat. No. 8,131,971.

(60) Provisional application No. 60/814,888, filed on Jun. 20, 2006, provisional application No. 60/872,767, filed on Dec. 5, 2006.

(51) Int. Cl.
*G06F 13/00* (2006.01)
*G06F 17/30* (2006.01)
*H04L 29/08* (2006.01)

(52) U.S. Cl.
CPC .... *G06F 17/30781* (2013.01); *H04L 29/08333* (2013.01); *H04L 29/08306* (2013.01); *H04L 29/08324* (2013.01); *H04L 67/104* (2013.01); *G06F 17/30206* (2013.01)
USPC ........... 709/236; 709/231; 709/232; 709/214; 709/201

(58) Field of Classification Search
CPC .................. G06F 17/30781; G06F 17/30206; H04L 29/08306; H04L 29/08324; H04L 29/08333; H04L 67/104
USPC ......... 709/236, 231, 232, 230, 201, 213, 214, 709/217
See application file for complete search history.

(56) References Cited

U.S. PATENT DOCUMENTS

| | | | |
|---|---|---|---|
| 7,076,553 B2 | 7/2006 | Chan | |
| 7,181,523 B2 | 2/2007 | Sim | |
| 7,206,934 B2 * | 4/2007 | Pabla et al. | 713/168 |
| 7,225,228 B2 * | 5/2007 | Soto et al. | 709/205 |
| 7,565,405 B2 * | 7/2009 | Grosse et al. | 709/214 |
| 7,657,597 B2 * | 2/2010 | Arora et al. | 709/206 |
| 7,685,301 B2 * | 3/2010 | Mai | 709/230 |
| 8,051,205 B2 * | 11/2011 | Roy et al. | 709/244 |
| 2003/0182373 A1 * | 9/2003 | Soto et al. | 709/204 |

(Continued)

OTHER PUBLICATIONS

Sudharshan S. Vazhkudai, FreeLoader: Scavenging Desktop Storage Resources for Scientific Data, 2005 Association for Computing Machinery.

(Continued)

*Primary Examiner* — Kenneth Coulter

(57) ABSTRACT

Methods and systems for distributed push-to-storage with redundancy. One method includes the steps of setting at least two storage groups according to a required storage redundancy; registering a plurality of peer-to-peer devices; associating the peer-to-peer devices with at least one of the storage groups; receiving a first content having a large size to be stored in the at least two storage groups; fragmenting the first content into a plurality of first content fragments having a small size; and distributing the first content fragments approximately homogenously between the peer-to-peer devices associated with each storage group according to a first distribution function associated with each storage group.

24 Claims, 22 Drawing Sheets

(56) References Cited

U.S. PATENT DOCUMENTS

| | | | |
|---|---|---|---|
| 2004/0064512 A1* | 4/2004 | Arora et al. | 709/206 |
| 2004/0064568 A1* | 4/2004 | Arora et al. | 709/228 |
| 2004/0064693 A1* | 4/2004 | Pabla et al. | 713/168 |
| 2004/0216164 A1 | 10/2004 | Hayhurst | |
| 2005/0086287 A1* | 4/2005 | Datta | 709/201 |
| 2005/0086288 A1* | 4/2005 | Datta et al. | 709/201 |
| 2005/0086350 A1* | 4/2005 | Mai | 709/230 |
| 2006/0075063 A1* | 4/2006 | Grosse et al. | 709/217 |
| 2006/0242155 A1 | 10/2006 | Moore | |
| 2007/0050590 A1 | 3/2007 | Syed et al. | |
| 2007/0250590 A1* | 10/2007 | Flannery et al. | 709/217 |
| 2007/0274327 A1 | 11/2007 | Kaarela et al. | |
| 2007/0288638 A1 | 12/2007 | Vuong et al. | |
| 2010/0094921 A1* | 4/2010 | Roy et al. | 709/201 |
| 2010/0146094 A1* | 6/2010 | Elkayam et al. | 709/223 |

OTHER PUBLICATIONS

John H. Hartman, The Zebra Striped Network File System, University of California, Berkeley, 1995.

Jack Y. B. Lee, Design and Analysis of a Fault-Tolerant Mechanism for a Server-Less Video-On-Demand System, 2002 IEEE.

Mohamed M. Hefeeda, A hybrid architecture for cost-effective on-demand media streaming, 2003 Elsevier.

Kyoungwon Suh, Push-to-Peer Video-on-Demand system: design and evaluation, Aug. 22, 2007.

* cited by examiner

DISTRIBUTED PUSH-TO-STORAGE SYSTEM WITH REDUNDANCY

CROSS-REFERENCE TO RELATED APPLICATIONS

This application is a continuation of U.S. application Ser. No. 12/305,957, filed Dec. 20, 2008, now U.S. Pat No. 8,131, 971, which is the National Stage of International Application No. PCT/IB2007/52392, filed Jun. 20, 2007, which claims the benefit under 35 U.S.C. 119(e) of U.S. Provisional Patent Application No. 60/814,888, filed Jun. 20, 2006, and U.S. Provisional Patent Application No. 60/872,767, filed Dec. 5, 2006, the entire contents of which are herein incorporated by reference.

BACKGROUND

Prior art peer-to-peer file sharing software/networks, also known as P2P, enable a community of peer client users, such as PCs or Set Top Boxes (STB), to share video or audio files via the Internet. These prior art file sharing systems are incapable of delivering Video On Demand (VoD) since they cannot support quick streaming of the content.

Other prior art related systems are known as peer-assisted broadcasting trees, in which every participating peer is broadcasting the stream to other peers; this results in a broadcasting streaming system that, among other things, is incapable of supporting VoD that requires a unique stream per viewer.

P2P distributed file sharing, where pieces of a file are widely distributed across a number of peers, is known in the art. Whenever a client requests a download of such a file, the request is serviced from a plurality of peers rather than directly from the server. For example, one such scheme, referred to as "Swarmcast," spreads the load placed on a web site offering popular downloadable content by breaking files into much smaller pieces. Once a user has installed the Swarmcast client program, his computer automatically cooperate with other users' computers by passing around pieces of data that the users have already downloaded, thereby reducing the overall serving load on the central server. A similar scheme, referred to as "BitTorrent," works along similar principles. In particular, when under low load, a web site which serves large files using the BitTorrent scheme will behave much like a typical http server since it performs most of the serving itself. However, when the server load reaches some relatively high level, BitTorrent will shift to a state where most of the upload burden is borne by the downloading clients themselves, which service other downloading clients.

Additional background information about Video On Demand and about Video On Demand Patent Platform may be found at www.patentVC.com.

BRIEF DESCRIPTION OF THE DRAWINGS

The embodiments of the present invention are herein described, by way of example only, with reference to the accompanying drawings. With specific reference now to the drawings, it is stressed that the particulars shown are by way of example and for purposes of illustrative discussion of the embodiments of the present invention only, and are presented in order to provide what is believed to be the most useful and readily understood description of the principles and conceptual aspects of the embodiments of the present invention. In this regard, no attempt is made to show structural details of the embodiments in more detail than is necessary for a fundamental understanding of the invention. In the drawings.

DETAILED DESCRIPTION

Figure 1:
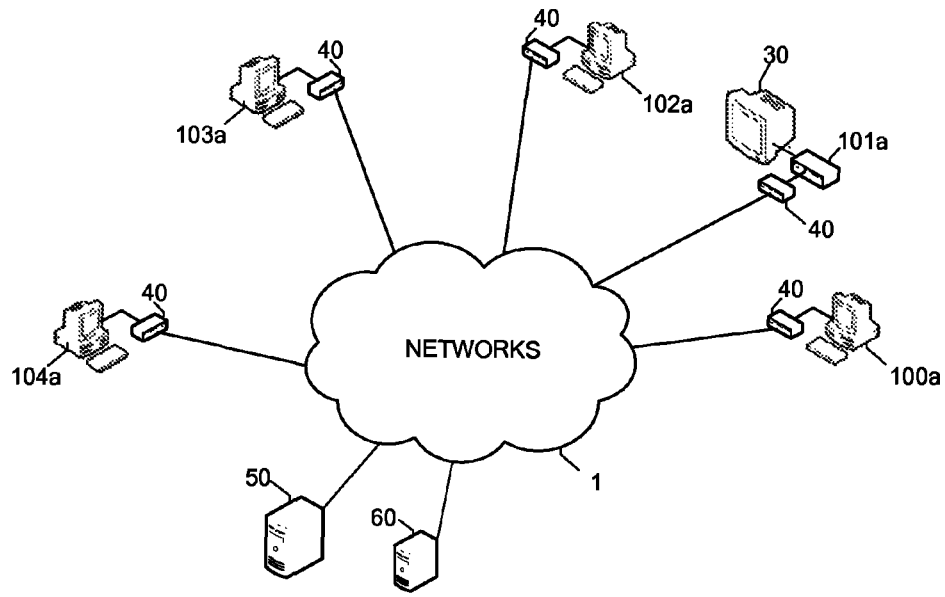
FIGS. 1-2 illustrate embodiments in accordance with the present invention.

In the following description, numerous specific details are set forth. However, it is understood that the embodiments of the invention may be practiced without these specific details. In other instances, well-known hardware, software, materials, structures and techniques have not been shown in detail in order not to obscure the understanding of this description. In this description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated and except as will be readily apparent to those of ordinary skill in the art. Thus, the invention can include any variety of combinations and/or integrations of the embodiments described herein. Moreover, in this description, the phrase "exemplary embodiment" means that the embodiment being referred to serves as an example or illustration. Also herein, flow diagrams illustrate non-limiting embodiment examples of the methods; block diagrams illustrate non-limiting embodiment examples of the devices. Some of the operations of the flow diagrams are described with reference to the embodiments illustrated by the block diagrams. However, it is to be understood that the methods of the flow diagrams could be performed by embodiments of the invention other than those discussed with reference to the block diagrams, and embodiments discussed with references to the block diagrams could perform operations different than those discussed with reference to the flow diagrams. Moreover, it is to be understood that although the flow diagrams may depict serial operations, certain embodiments could perform certain of those operations in parallel and/or in different orders.

The terms "storage-and-computing element" and "peer client" denote an element comprising computational capability, storage capability and connectivity to a communication network, including, but not limited to, computers, personal computers, set top boxes, gaming consoles, embedded systems, and cell phones.

The terms "storage-and-computing element type" and "storage element type" and "peer client type" and "node type" denote an association to a certain partition of content fragments. A storage-and-computing element associated with type 'x' should store the content fragments indicated by a partition of content fragments that is associated with storage-and-computing element type 'x'. A storage-and-computing element assigned to more than one type, should store the content-fragments indicated by all of the types associated with it. All storage-and-computing elements associated with the same type should comprise approximately the same content fragments.

The term "hash function" refers to any mechanism and/or algorithm and/or data structure that associates data fragments to a peer client type. For example, the hash function may be an analytic function, hash table, polynomial series, Galois field, etc.

The term "content-striped hashed record" refers to the data stored in a peer client. The content-striped hashed record is made of "hashed records"

FIG. 1 illustrates one embodiment of the present invention, including: peer client devices (100a, 101a, 102a, 103a and 104a), a network 1, and a control server 50. The peer client devices may be any storage-enabled computing devices, such as, but not limited to, PC based clients (100a, 102a, 103a and 104a), STB (Set Top Box) based clients 101a, or any combination thereof. The peer client devices 100a, 101a, 102a, 103a, 104a are part of a cluster of peers that are inter-connected via the network 1. The peer client devices connect to the network 1 using data modems 40, such as, but not limited to, xDSL, DOCSIS, PON, ETHERNET, a dial-up modem, a modem supporting two way data communication, or two modems each supporting one way data communication. The network 1 may be the Internet, an ISP network, an Operator Network, a corporate data network, or any other form of network capable of inter-connecting a plurality of peer clients.

The at least one control server 50 manages the following steps in its cluster:

Creating content-striped hashed records.

Distributing the content-striped hashed records among the peer clients of the cluster that is managed by the control server 50.

Registering peer clients and allocating each peer client to a type.

In one embodiment, 1. Each peer client holds all the information originally stored by the control server 50. 2. A first peer client holds a pointer to other peer clients which store the data that was stored in the control server 50. 3. The data that was originally stored in the control server 50 is distributed between the peer clients and the peer clients can locate the required hash function when needed.

In one embodiment, the control server 50 assigns a peer client type to each peer client, for example by implementing the following steps:

The control server 50 sets 'n' peer client types.

The control server 50 assigns each peer client under its control to at least one of the peer client types.

Figure 2:
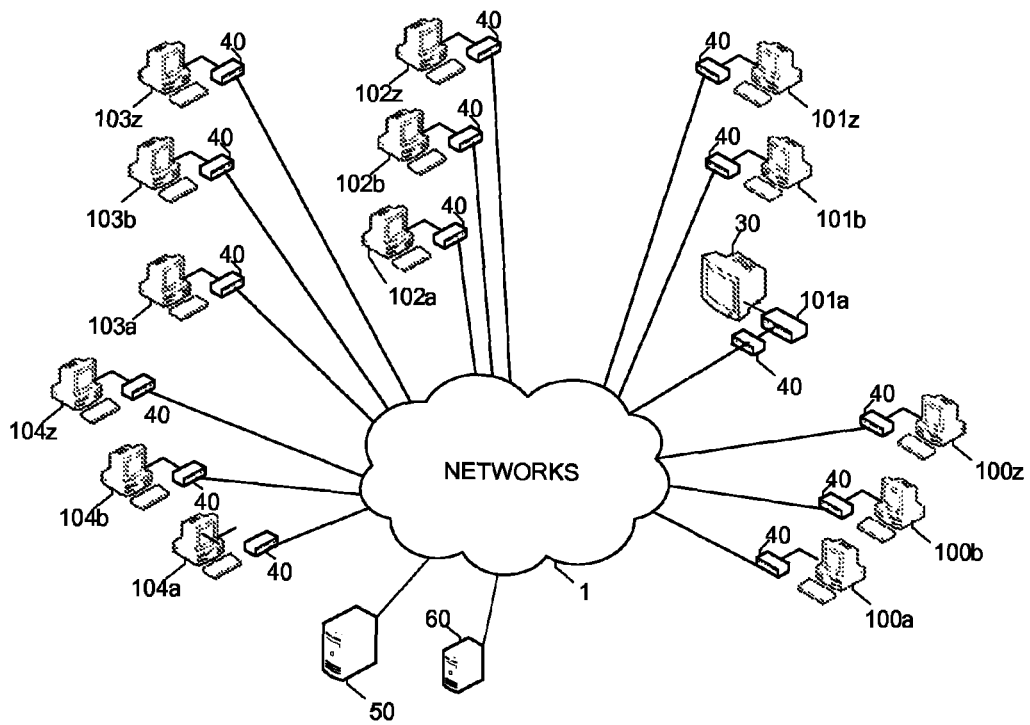

FIG. 2 illustrates a peer-assisted system with 5 peer client types ('n'=5). The peer clients 100a, 100b up to 100z are assigned to peer client type #1, the peer clients 101a, 101b up to 101z are assigned to peer client type #2, the peer clients 102a, 102b up to 102z are assigned to peer client type #3, the peer clients 103a, 103b up to 103z are assigned to peer client type #4, and the peer clients 104a, 104b up to 104z are assigned to peer client type #5. Although FIG. 2 illustrates 5 peer client types, the concept is not limited to five peer client types, and may include a smaller or greater number of peer client types, that may reach hundreds, and thousands of peer client types in a peer-assisted system.

Optionally, the control server 50 may attempt to assign an equal or an unequal number of peer clients per peer client type. Optionally, the control server 50 may attempt to uniformly distribute the peer clients assigned to the same peer client type according to a selected criterion. Optionally, the control server 50 may attempt to distribute the peer clients assigned to the same peer client type according the measured and/or estimated performances of each client, such as bandwidth and availability.

Figure 3:
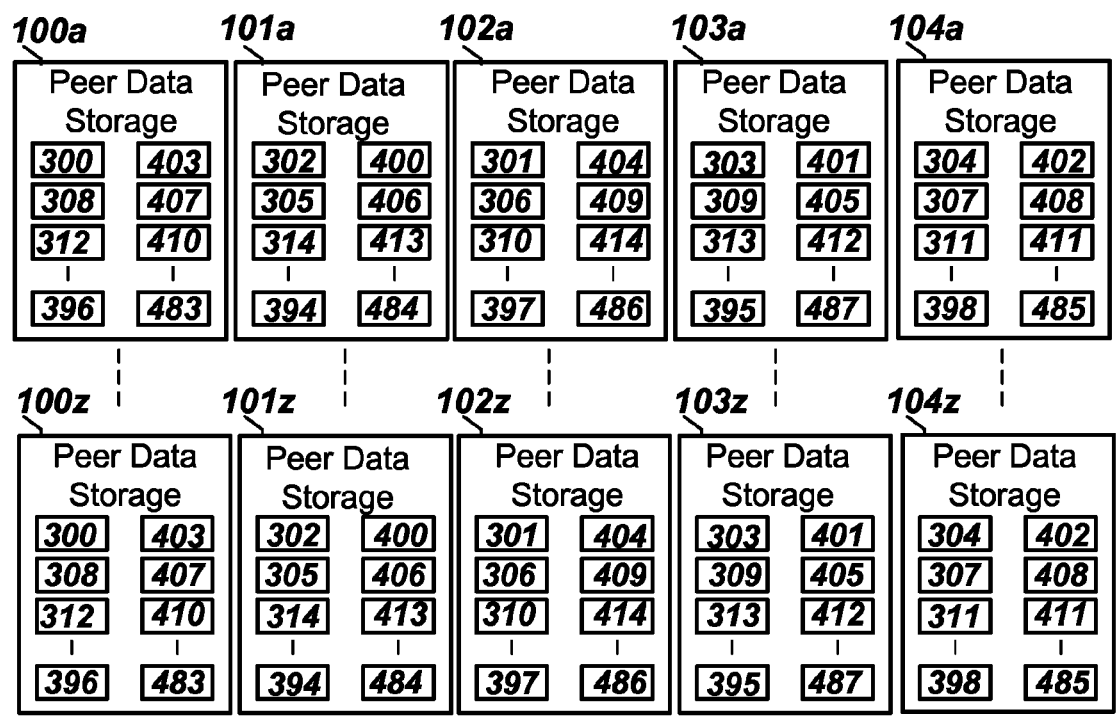
FIGS. 3-6 illustrate content fragment retrieving diagrams in accordance with some embodiments of the present invention.

FIG. 3 illustrates an example of one embodiment wherein two original content files (520 and 530) are to be processed by the peer-assisted system. The original content file 520 is striped by the control server into 'm' sequential fragments 300, 301, 302, 303, 304, 305 up to 398, referred to as content fragments. In this example, m=99. The original content file 530 is striped into 'l'=88 sequential content fragments 400, 401, 402, 403, 404, 405 up to 487.

The 'm' and 'l' content fragments of the original content files 520 and 530 may now be reorganized into 'x' hashed records, such that the hashed records 581, 582, 583, 584, and 585 collaboratively store the entire original content of file 520, and the hashed records 591, 592, 593, 594, and 595 collaboratively store the entire original content of file 530. In this example, x=5. The content-stripped hashed records are made of the hashed records.

Optionally, 'x' equals 'n' and each hashed record is assigned to its corresponding peer client type. Alternatively, 'x' is different from 'n' and the hashed records are distributed between the various peer client types according to a predicted method.

Different hashed records may contain different amounts of content fragments. Different content-stripped hashed records may contain different amounts of hashed records.

In one embodiment, each title (also refers to a content file or content files) has a unique title identification (ID). The unique title identification may be, but is not limited to, the content file name. Each content fragment has a header, comprising (i) the title ID associated with the content fragment, and (ii) the position of the content fragment within the title, such as a serial number of the fragment within the title, referred to as fragment number. For example, each peer may be able to access a table of title IDs and fragment numbers; the table may be stored in a dedicated server/peer or other accessible storage. When the peer receives an inquiry containing a title ID and a fragment number within the title ID, it may be able to locate and transmit the required matching content fragment.

Optionally, the reorganization of the original content files into hashed records may be done in a pseudo-random manner, such that (for example) the hashed record 581 contains a sequence of data fragments 300, 308, 312 up to 396 that represent a portion of the original content file 520; in this example, this portion comprises about 20 fragments out of the 99 fragments present in the original content file 520, which corresponds to about 1/n=1/5 of the original fragments that were rearranged in n=5 different peer client types according to the illustrated example. The hashed record 581 sequence of 300, 308, 312 up to 396 fragments and the other hashed records sequences are a direct result of the selection of an actual pseudo-random sequence that is used in rearranging the original content file into n peer client types of content-striped hashed records.

Without limiting the scope of the invention, the pseudo-random hash function may be calculated according to a pseudo-random primitive polynomial that is modulo over n (as an example), or may be calculated using a hash function operated on the Name string of each fragment (as an example), or may be looked up from a hashing table (as an example), or may be performed in any other way.

For clarification purposes only, in the case of using a hash function operated on the Name string of each fragment (the Name string is the argument for the hash function), the fragments of the original content file 520 may be named, as an example, "300", "301", "302" up to "398" corresponding to the fragments 300, 301, 302, 303, 304, 305 up to 398 (the string name is identical to the fragment reference number in this example for clarity only. Optionally, the strings is unique and have a sequential running number or symbol embedded); the hash function that operates on the strings may result, as an example, in the following translation:

Hash-Function("300")=1, Hash-Function("301")=3, Hash-Function("302")=2, Hash-Function("303")=4, Hash-Function("304")=5, Hash-Function("305")=2, Hash-Function("306")=3, Hash-Function("307")=5 and so on up to Hash-Function("398")=5, which means that fragment 300 is allocated to peer client type #1, fragment 301 is allocated to peer client type #3, fragment 302 is allocated to peer client type 2, fragment 303 is allocated to peer client type 4, fragment 304 is allocated to peer client type 5, fragment 305 is allocated to peer client type 2, fragment 306 is allocated to peer client type 3, fragment 307 is allocated to peer client type 5, and so on up to fragment 398 that is allocated to peer client type #5; the result is illustrated in the hashed records 581, 582, 583, 584, and 585, that correspond to peer client types #1, #2, #3, #4, and #5, respectively. Similarly, the result of using a hash function on the fragments of the original content file 530 (by using the string sequences "400", "401", "402" up to "487" as arguments) is illustrated in the content-striped hashed records 591, 592, 593, 594, and 595, that correspond to peer client types #1, #2, #3, #4, and #5, respectively.

The steps of striping each content into 'n' peer client types (also illustrated by FIG. 3) may be performed by the control server 50 or by another suitable computing device, such as one of the peer clients. The original content files (520, 530) may be stored in the control server 50, or may be distributed on the fly. If the original content files are distributed on the fly, the hash function is provided in advance and distributed to the peer clients of the cluster.

In one embodiment, the method for hashing the original content file features the following requirements:

a) Every original content file is hashed orthogonally to all of the other content-striped hashed records, such that the Fragment-to-type rearranging sequences have little or no correlation between themselves, or between themselves and any time-shifted version of themselves; without limiting the scope of the invention, this can be readily achieved, for example, by choosing a good hash function, such that a small variation in the name string yields a completely different rearranging sequence, or by choosing different primitive pseudo-random polynomials per original content file, or by using different hashing tables per original content file.

b) Every Fragment-to-type rearranging sequence has little or no correlation with time-shifted copies of itself, without limiting the scope of the invention, this can be readily achieved, for example, by choosing a good hash function, or by using primitive pseudo-random polynomials, or by generating good hashing tables.

c) The method used for hashing should yield a Fragment-to-type rearranging sequence that is predictable. All of the methods above comply with this requirement in a non limiting fashion.

Still referring to FIGS. 2 and 3, the 'n' peer client types (n=5 in the illustrated example) of content-striped hashed records per each of the original content files 520, 530, are transferred via the network 1 to all of the peer clients, such that all peers set as peer client type #1 (100a up to 100z) receive the content-striped hashed records of peer client type #1 (content-striped hashed record 581 belonging to content 520, and content-striped hashed record 591 belonging to content 530), all peers set as peer client type #2 (101a up to 101z) receive the content-striped hashed records of peer client type #2 (content-striped hashed record 582 belonging to content 520, and content-striped hashed record 592 belonging to the content 530), all peers set as peer client type #3 (102a up to 102z) receive the content-striped hashed records of peer client type #3 (content-striped hashed record 583 belonging to content 520, and content-striped hashed record 593 belonging to content 530), all peers set as peer client type #4 (103a up to 103z) receive the content-striped hashed records of peer client type #4 (content-striped hashed record 584 belonging to content 520, and content-striped hashed record 594 belonging to content 530) and all peers set as peer client type #5 (104a up to 104z) receive the content-striped hashed records of peer client type #5 (content-striped hashed record 585 belonging to content 520, and content-striped hashed record 595 belonging to content 530).

In one non-limiting embodiment, the control server 50 distributes the content-striped hashed records to the appropriate peer clients. Alternatively, the content-striped hashed records are pulled by the appropriate peer clients.

The following are methods for propagating the content-striped hashed records to the peer clients. It is to be noted that the distribution of the content-striped hashed records among the peer clients can be done using conventional peer-to-peer file sharing techniques (so that the distribution load on the control server is reduced), or it can be done directly by the control server to each of the peers, or using cache servers, but is not limited to these implementations.

It is to be noted that although the content-striped hashed records are sometimes disclosed as being distributed to the peer clients as a single file per content-striped hashed record, distribution is not limited to this implementation, and it is also possible to distribute each content-striped hashed record as a sequence of several files, or it is possible to aggregate several content-striped hashed records into a single file, or to use any other alternative implementation.

The peer clients receive the various content-striped hashed records, and store them in their memories. The memory may be Flash, Hard Disk, RAM, or any other type of memory in a non limiting fashion. Peer 100a, set as peer client type #1, as an example, stores both content-striped hashed records 581 and 591 (depicted as fragments 300, 308, 312 up to 396 and fragments 403, 407, 410 up to 483 respectively) because both are set as peer client type #1.

Optionally, the actual peer storage may reside outside the peer itself, for example, on an external flash memory connected to a set top box. The peer may include a file system that manages that external memory.

In one embodiment, whichever way is used for distributing the content-striped hashed records among the peer clients, each peer client by itself stores only about 1/n of the total original content that was distributed, and therefore a plurality of clients, each having relatively small memory size, can be used to store very large volumes of original content.

It is to be noted that the content stored in each peer by itself is useless, because it represents only a small portion of each of the original content files, and these portions represent content fragments that are not in a sequential order. Presentation of the content is not possible given the data stored in a small amount of peers.

In one embodiment, all peers of the same peer client type store the exact same data (content fragments). As there are more peers storing the same data, the redundancy of the system increases.

When a peer client starts to consume content, for example, in order to watch a movie, the peer client may inquire the control server 50 for available content, or alternatively access the list of available content that may be stored in any reasonable location, such as, but not limited to, the peer client itself or another peer client.

In one embodiment, the peer client may inquire the control server 50 for available content, and the control server 50 may then transmit to the requesting peer client a retrieval function. The retrieval function may be (i) the hash function that was used to generate the Fragment-to-type rearranging sequence, or (ii) a designated content fragments retrieval function, or (iii) a designated peer types retrieval function, or (iv) any other method that enables the peer to retrieve the required content fragments from the other peers. Alternatively, the hash function may already be known to the peer client in advance.

The requesting peer client, now equipped with the information used to generate the Fragment-to-type rearranging sequence of the desired original content, has a complete and accurate way of determining which peer client type stores which fragment of the desired content.

The requesting peer client may then use the hash function to have the Fragment-to-type rearranging sequence, and determine the location of the desired content fragments.

Figure 4:
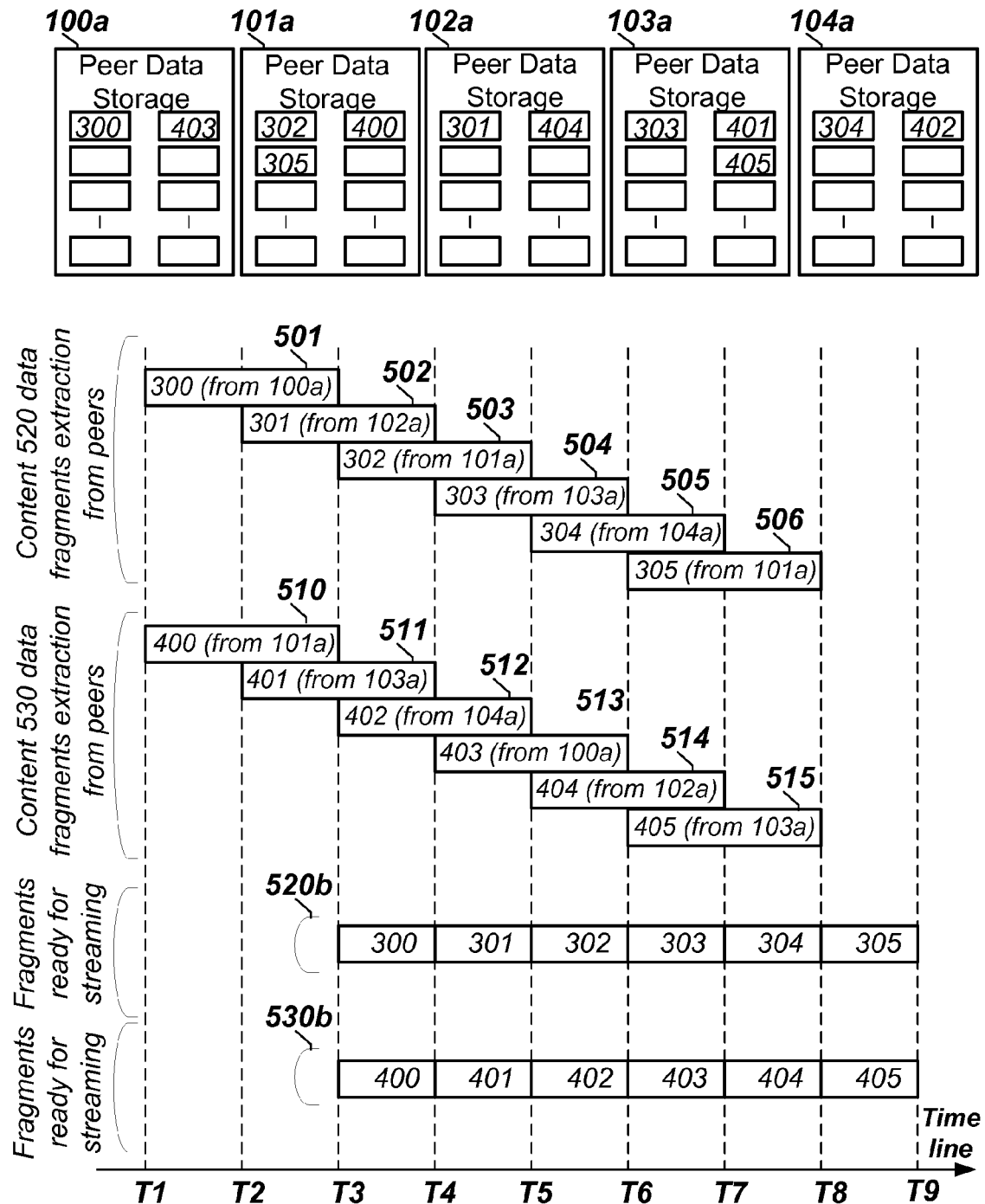

Referring to FIG. 4, in one embodiment where a hash function is used to generate the Fragment-to-type rearranging sequence, the peer client may calculate the location of the first fragment of the desired content by evaluating, for example, the expression (the function)—Hash-Function("300"), which yields the result '1', meaning that the first fragment 300 can be located at any peer set as peer client type #1 (one of them is depicted as 100*a* in FIG. 4). It is to be noted that content file 520 is depicted as an example, and in this case the controller sends the requesting peer client the name string of the first fragment, which is "300". It is assumed that content file 520 is a streaming video file throughout the rest of the section in a non limiting fashion.

In this example, the requesting peer client now contacts peer client 100*a*, and requests the first fragment 300; peer client 100*a* starts sending the requested fragment 300 to the requesting peer client at time T1 via the network(s) as communication session 501 that ends at time T3 (it is assumed, as a non limiting example, that sending one fragment takes two time ticks, and that each fragment represents a frame of video). At time T3, the requested fragment 300 is completely received by the requesting peer client, and is stored as fragment 300 in its streaming (or download) buffer 520*b*; the requesting peer client can start streaming the first video fragment 300 at time T3, and until T4. It is assumed in this example, in a non limiting fashion, that each video frame is played from T[n] to T[n+1] (one time tick), and thus the time it takes for a peer client to uplink the fragment is twice as long as it takes to stream the fragment when playing it, which corresponds to the situation where each peer client has twice the downlink bandwidth than uplink bandwidth, and the downlink bandwidth is equal to the video playback streaming bandwidth.

The requesting peer must prepare the second fragment 301 for streaming playback no later than time T4 in order to guarantee smooth playback transition from fragment 300, and it thus continues by evaluating the expression Hash-Function("301"), which yields the result 3, meaning that the second fragment 301 can be located at any peer set as peer client type #3 (one of them is depicted as 102*a* in FIG. 4); the requesting peer client now contacts peer client 101*a* at time T2, and requests the second fragment 301; peer client 102*a* starts sending the requested fragment 301 to the requesting peer client at time T2 via the network(s) as communication sessions 502 that ends at time T4; at time T4, the requested fragment 301 is completely received by the requesting peer client, and is stored as fragment 301 in its streaming (or download) buffer 520*b*; the requesting peer client can now continue with the streaming video playback from T3 to T4. This process is repeated for fragments 302, 303, 304, 305 as depicted in the inter-peer communication sessions 503, 504, 505 and 506 respectively; the depicted peer activity results in a reconstructed original content 520, which is assembled in the requesting peer client's streaming buffer 520*b*, and streamed at short duration (streaming of fragments 300-305 is depicted for clarification purposes, but the process is maintained until the last fragment 398 is received and streamed).

It is to be noted that in the non-limiting case of video content, each frame/fragment has a duration of about 30 milliseconds, which means that each time tick is 30 milliseconds, and the user can start streaming playback of the content approximately 60 milliseconds after first requesting the content; this results in an instantaneous video on demand user experience.

It is to be noted that although each peer client's uplink bandwidth is ½ the bandwidth of the streaming video content in the described example, the collaboration of several peer client types (as described) results in an aggregated uplink streaming capability that is sufficient to support the full bandwidth of the video playback stream; this advantage is not limited to downlink/uplink ratios of 2/1 (as described in the example), and can be generally applied to any downlink/uplink ratio, as can be found in many asymmetrical broadband connections, such as, but not limited to, ADSL, DOCSIS, and PON. This of course does not limit the peer-assisted system's ability to support symmetrical bandwidth connections, such as, but not limited to, ETHERNET, certain PONs and xDSLs. The aggregated uplink streaming effect is possible as a direct result of using a pseudo-random Fragment-to-type rearranging sequence that ensures that no consecutive fragments are stored in one peer client.

It is to be noted that the requesting peer in the above example may be one of peers 100*a-z*, 101*a-z*, 102*a-z*, 103*a-z* or 104*a-z*, or even a peer client that does not participate in the collaborative storage of the original content.

It is to be noted that although the above example describes a fragment extraction from the five peer client types 100*a*, 101*a*, 102*a*, 103*a*, 104*a*, the requesting peer client can choose to extract any specific fragment from all peer clients that are assigned the peer client type that holds this fragment, so that any fragment extracted from 100*a* for example, can readily be extracted from any of the other peers assigned to peer client type #1 (100*a-z*); this disclosed redundancy mechanism can also be exploited for best path selection, as disclosed below.

It is to be noted that the assurance that a specific content fragment actually resides in a peer client that is predicted by the Fragment-to-type rearranging sequence is guaranteed by the fact that the content is distributed a priori to the consumption process, and regardless of what peer clients choose to consume.

The real time extraction of all requested fragments in sequential on-time streaming order is possible because of the requesting client has enough available peers from all peer client types, at almost any point in the time of streaming as a result of the pseudo-random distribution of fragments of content among a pre-determined (a priori) cluster or peer clients (as deterministically determined by the control server).

Optionally, the process of determining where the next fragment resides, and the gathering of the fragments are done with no need for real-time intervention of the control server, and this is a direct result of using a pseudo-random Fragment-to-type rearranging sequence that is totally predictable and calculable by each peer client in the peer-assisted system.

FIG. 4 illustrates one embodiment where a second peer client is consuming the content 530 at time T1, in parallel to the already described process of the first peer client consuming the content 520. The second peer retrieves and assembles the content 530 fragments 400, 401, 402, 403, 404, and 405 as illustrated by the inter-peer communication sessions 510, 511, 512, 513, 514, and 515 respectively (in a process similar to the one described for the first peer), and constructs its streaming buffer 530b. The peer cluster that consists in this example of peers 100a, 101a, 102a, 103a, 104a is now required to uplink all of the requested fragments to both of the requesting peers, such that the streaming continuity of both stream 520b and stream 530b are maintained throughout the process; the following description is disclosed as a method of achieving this requirement.

Since the pseudo-random method that was used to generate the Fragment-to-type rearranging sequences yields two uncorrelated sequences for the two contents 520, 530 (in the examples above two different name string sequences were used for the two contents as arguments to the hash function), the two uplink streams generated by the peer clients for the two requested contents are (optionally) statistically evenly spread all over the peer clients in the cluster, and this assures a non-blocking cluster operation; this effect is demonstrated in FIG. 4 as follows: since in this example the downlink/uplink bandwidth ratio is 2/1, at any given time of the streaming process four different peer clients must stream uplink data in order to support the streaming of the two content files; in the time interval between T2 and T3 four different peer clients—100a, 102a, 101a and 103a—actively uplink streaming data, in the time interval between T3 and T4 four different peer clients—102a, 101a, 103a and 104a—actively uplink streaming data; in the time interval between T4 and T5 four different peer clients—101a, 103a, 104a and 100a are actively uplink streaming data; in the time interval between T5 and T6 four different peer clients—103a, 104a, 100a and 102a—actively uplink streaming data; in the time interval between T6 and T7 four different peer clients—104a, 101a, 102a and 103a—actively uplink streaming data; it is clear that at any given time indeed four different peer clients are collectively producing the streaming load needed to support the two content streams, in such a way that most of the cluster (⅘ in this specific example) is utilized at any given time, and such that no blocking occurs; this high utilization is accomplished as a direct result of the uncorrelated nature of the two sequences used to spread the fragments of the two contents across the cluster.

The above described non-blocking cluster operation may be applicable to any number of content streams, and any number of peer client types, as long as all sequences used to spread all of the content streams' fragment across the cluster are uncorrelated, and as long as the aggregated uplink bandwidth of the cluster approximately equals or exceeds the aggregated bandwidth of all the streams transmitted at any given time.

Figure 5:
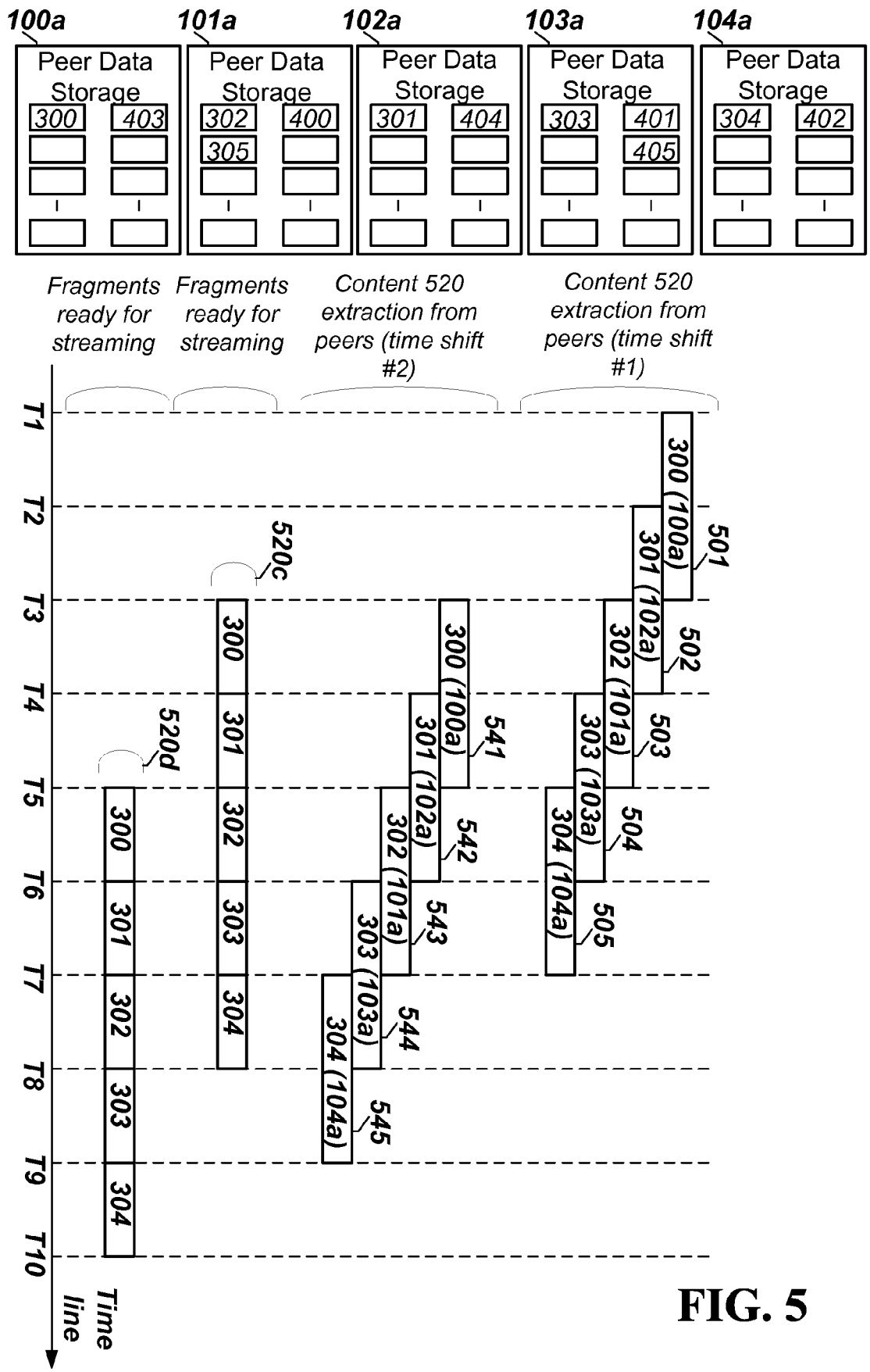

FIG. 5 illustrates one embodiment where a second peer client is consuming the same content that is consumed by the first peer client (content 520), but with a time shift. The second peer client starts requesting at time T3 (two time ticks after the first requesting peer client). The first requesting peer client gathers fragments 300, 301, 302, 303, and 304 as illustrated in the inter-peer communication sessions 501, 502, 503, 504 and 505 respectively; the illustrated peer activity results in a reconstructed original content file 520, which is assembled in the first requesting peer client's streaming buffer 520c. The second requesting peer client gathers the same fragments 300, 301, 302, 303, and 304 (but two time ticks after the first requesting client) as illustrated in the inter-peer communication sessions 541, 542, 543, 544, and 545 respectively; the illustrated peer activity results in a reconstructed original content file 520, which is assembled in the second requesting peer client's streaming buffer 520d.

Since the pseudo-random Fragment-to-type rearranging sequence has ideally almost a zero autocorrelation (meaning that any two time shifted versions of the same sequence are uncorrelated), the two uplink streams generated by the peer clients for the two time shifts of the same content are statistically evenly spread all over the cluster, and this assures a non-blocking cluster operation; this effect is demonstrated in FIG. 5 as follows: since in this example the downlink/uplink bandwidth ratio is 2/1, at every given time of the streaming process four different peer clients must stream uplink data in order to support the streaming of the two time shifted streams in steady state; in the time interval between T4 and T5 four different peer clients—101a, 103a, 100a and 102a—actively uplink streaming data, in the time interval between T5 and T6 four different peer clients—103a, 104a, 102a and 101a—actively uplink streaming data; it is clear that at any given steady state time indeed four different peer clients are collectively producing the streaming load needed to support the two time shifted streams of the same content, in such a way that most of the cluster (⅘ in this specific example) is utilized at any given time, and such that no blocking occurs; this high utilization is accomplished as a direct result of the zero autocorrelation nature of the sequences used to spread the fragments of the two contents across the cluster.

The above described non-blocking cluster operation is readily applicable to any number of shifted steams of the same content (which is typical to a popular content being consumed by many peer clients at the same time, but with different viewing starting times), and any number of peer client types, as long as all sequences used to spread all of the content streams' fragments across the cluster have close to zero autocorrelation, and as long as the aggregated uplink bandwidth of the cluster equals or exceeds the aggregated bandwidth of all the streams transmitted at any given time.

Figure 7:
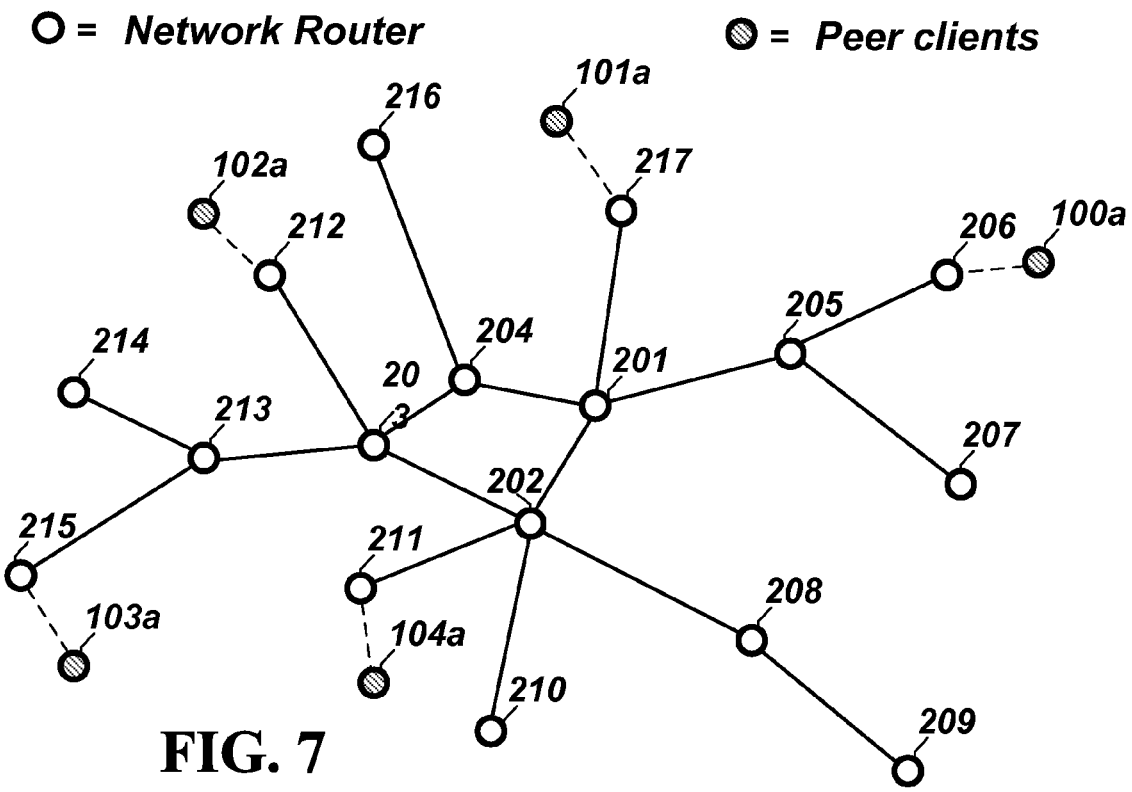
FIGS. 7-8 illustrate network maps in accordance with some embodiments of the present invention.

FIG. 7 illustrates one embodiment of a route selection for content fragments retrieval. As an example, in accordance with FIG. 4 and FIG. 5 and without limiting the generality of the embodiment of the present invention, the cluster has five peer clients of different types 100a, 101a, 102a, 103a, and 104a, each located in a different region of the interconnecting network that is composed of routing nodes 201, 202, 203, 204, 205, 206, 207, 208, 209, 210, 211, 213, 214, 214, 215, 216, and 217; the exemplary network of FIG. 7 can be a representation of the Internet, an ISP network, an operator network, a corporate network, or any other type of network capable of routing data in-between peer clients; the dashed lines applied to connect the peer clients with the network routers can represent a point-to-point connection, an operator aggregation network (switched or routed), DSLAM connections to clients, CATV connections to client, or any other means of connecting the peer clients with the interconnecting network composed of said routing nodes.

For example, when peer client 103a assembles content fragments for content consumption, it needs to reach all of the other peer clients 100a, 101a, 102a, 104a for fragment retrieval, since all participating peer client types of the content-striped hashed records must be accessed in order to reconstruct the original content; the probable route from 103a to 102a consists of nodes 215, 213, 203, 212; the probable route from 103a to 100a consists of nodes 215, 213, 203, 202, 201, 205, 206; and the probable routes to other peer clients are similarly constructed; it is clear that with this initial cluster size of peer clients, each peer client must reach across most regions of the interconnecting network in order to retrieve all fragments of the content being assembled.

Figure 8:
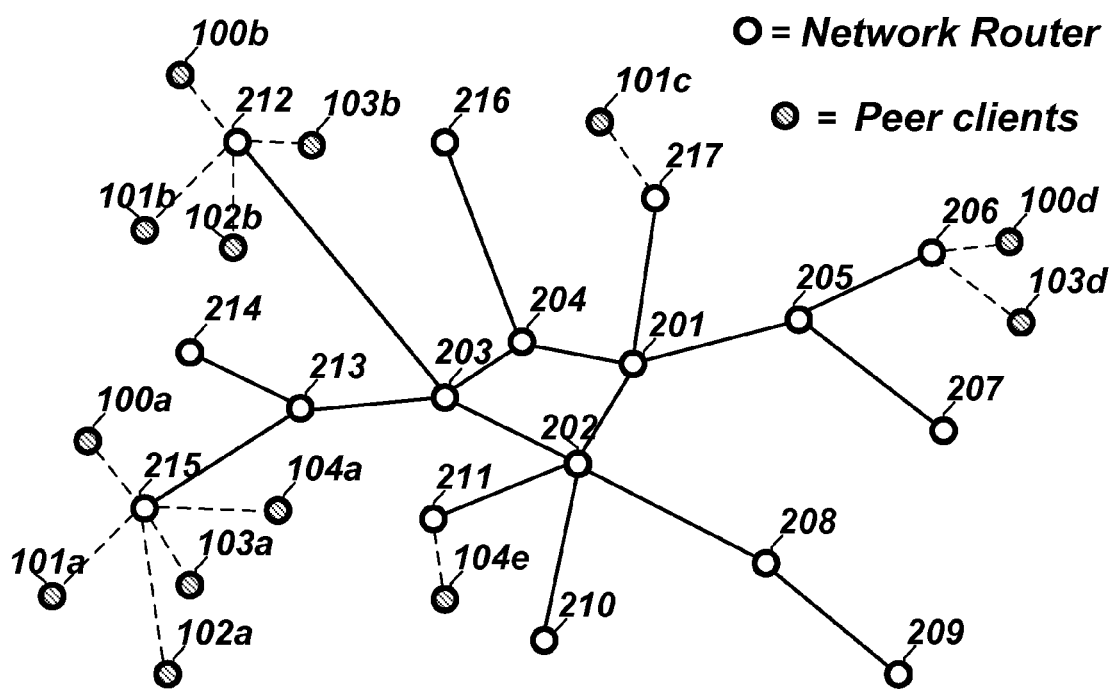

Referring now to FIG. 8, the cluster of FIG. 7 evolves and increases in size with the addition of new peer clients; it is noted that although the number of peer clients has increased from five to thirteen, there are still only five peer client types, such that some of the peer clients are storing the exact same content fragments as other peer clients in the cluster (belonging to the same peer client type). When, for example, peer client 103a assembles content fragments for content consumption, it still needs to reach all of the peer client types for fragment retrieval, but this time it has some choices of which specific peer client from each peer client type to turn to; when 103a is choosing which peer client of peer client type to turn to, it has the choice of 102a and 102b; the route to 102b consists of nodes 215, 213, 203, 212, while the route to 102a consists of only node 215; it is clear that 103a should prefer to fetch content fragments from 102a and not 102b, since the shorter route allows it to enjoy a reduced latency, reduced probability of packet dropping, and the overall advantage of traversing a smaller part of the inter-network. Peer client 103a has a short route not only to 102a, but also to all other peer clients of all the rest of the client types 100a, 101a, 104a, which means that peer client 103a can assemble any content that is stored in the cluster by traversing no further than node 215 of the network; if one of the peer clients 100a, 101a, 102a, 104a is unable to respond to peer client 103a requests (for example, if one of the PCs hosting one of these peers is off-line), then peer client 103a can fetch the specific content fragments belonging to the unavailable local peer client from farther in the network; this mechanism includes an inherent redundancy mechanism combined with a minimal route selection mechanism.

Peer client 103b has almost all peer client types available locally by peer clients 100b, 101b, 102b, but it needs to look further into the network to retrieve content fragments belonging to peer client type #5, for example, by turning to peer client 104e or 104a (since both these peers are located four node hops from 103b, each of them can be a good selection under the minimal hop criteria); other peer clients like peer client 101c, 104e, 100d, or 103d are more isolated, and have to fetch most fragments from distant network locations.

In one embodiment, as more and more peer clients join the cluster, there is an increasing statistical probability that most of them (and maybe eventually all of them) are able to retrieve all content fragments of all stored contents from within close network proximity. This method of peer-assisted best route selection is possible because of two fundamental advantages of the disclosed peer-assisted system. One is the fact that the content is evenly spread over all participating peer clients a priori to content consumption, and regardless of what the peer clients choose to consume, so that the statistical availability of relevant peer client types is guaranteed as long as the control server assures that there are more or less the same number of peer clients associated with each of the peer client types. The second advantage is the fact that since the control server can limit the amount of content that is stored in the cluster, it is statistically guaranteed that eventually there will be enough peer clients from all peer client types, such that close proximity to any of them can be assured from any peer client in the cluster.

Without limiting the scope of the embodiments, the minimal hop criteria may be implemented, for example, by each peer client, by calculating the number of hops per peer client candidate of each peer client type, or it can be pre-calculated by the control server in the form of a network nodes map/graph, or it can be done in any other way.

It is finally noted that the discussed embodiments are particularly useful in a non limiting fashion to a situation where a predetermined amount of video content (for example 1000 full-length motion pictures) is to be offered to an increasingly growing number of peer users, such that eventually the peer-assisted system has to transport an enormous amount of streams of the predetermined video content via a network (for example the Internet); in such a case, the ability to fetch each fragment from the right location can protect the network from congestion, can save the ISP or operator a lot of unnecessary network activity to remote locations (that is more expensive than local fetches), and can increase the quality of the video stream.

It is to be noted that although the example above describes the peer selection criteria as the minimal hops needed to reach each peer client, this is done in a non limiting fashion, and there are other ways of defining the best route criteria, such as, but not limited to, the minimal latency to each peer client criteria, or choosing a specific peer client from each peer client type such that the most available peer is selected (the one that can support maximal up-link throughput in that specific time).

In one embodiment of the invention, a graph of the network interconnections enables a peer client to determine the best peer client to approach for any specific fragment. Still referring to FIG. 8, the following process illustrates a method for constructing the network interconnections graph in assistance with the peer clients.

a) The control server (not illustrated in FIG. 8, but may be connected to any node in the network) selects an arbitrary routing node in the network. (The arbitrary routing node may also be the control server itself). The arbitrary routing node is referred to as the focal point. In this example, it is assumed that the focal point is node 201.

b) Each peer client when going on-line (in a non limiting fashion) initiates a trace-route test to the focal point; the results of that test are in the form of all connecting nodes between the peer client and the focal point; as an example, when peer client 103a initiates the test, the results are nodes 215, 213, 203, 204 which are the connecting nodes between 103a and the focal point 201. The results of all these tests done by all peer clients are reported to the control server, and are stored there.

c) The control server looks at all the accumulated reported trace-route tests results (lists of connected nodes) of all of the controlled peer clients in the cluster; it dynamically constructs a graph of the network(s) using the following heuristic: all the reported lists are connected to the focal point; any node that appears in more than one list is reduced into a single node, while maintaining the sum of all of its connections to other nodes in said lists.

d) Step c is repeated for each new report that comes from a new peer client or from a peer client that has switched on-line (in a non limiting fashion).

e) The result of steps c and d is a constantly updated graph of the network interconnections.

Optionally, the dynamically constructed graph is sent to all peer clients, and enables them to accurately pick the closest peer client for fragment extraction.

It is to be noted that the above method does not map portions of the network that do not lead to a peer client, so, for example, nodes 214, 216, 210, 208, 209, 207 are not mapped, since no peer client initiates a trace-route test that includes them in the path to the focal point. They will be mapped as soon as more peer clients join the cluster and are connected to these nodes somehow.

It is to be noted that in case of a very large interconnecting network (the global Internet for example), it may be impractical to send the entire graph (that can include many thousands of nodes) to each client; in this case, the control server (or servers) may prune the graph and transmit each peer client only a small fraction of the graph that represents the portion of the network that is in the peer client's vicinity (including the related peer clients attached to the nodes of that portion of the network).

It is to be noted that several control servers can split the load between themselves, such that each server maps a portion of the network.

Another method of choosing the nearest peer clients for content fragments reassembly is disclosed as follows; still referring to FIG. 8, the control server selects several network nodes that are more or less equidistance from each other; nodes 212, 206, 209, 215 are taken as a non limiting example; these nodes are called reference nodes. Each peer client calculates the number of hops to each reference node, and constructs a j-dimensional coordinate point (in our example, j=4); peer client 103a, for example, has the coordinates of [3, 6, 5, 0] since it is located 3, 6, 5, and 0 hopes from 212, 206, 209, 215 respectively. The peers have a list of all other relevant peers' coordinates (which is synchronized and updated by the control server in a non limiting fashion); when a requesting peer client wants to select a peer client for fragment extraction, it chooses a peer client with the minimal j-dimensional distance from it; the minimal distance criteria can be root-mean-square based as a non limiting example.

Still referring to FIG. 8, when a new peer client is registered with the peer-assisted system, the control server has to decide which peer client type to allocate to it; the following process discloses an efficient method for all future inter-peer-clients communication:

a) The control server assumes that the newly added peer client is of peer client type #0, and calculates the aggregated hop count for the entire cluster; this is done by summing up all hop counts from each peer client to all optimally selected peers used to fetch all peer client types of fragments; the result of this calculation is a measurement of how efficient the current cluster configuration is (it is noted that the criteria used in this example is based on hop count, but any other criteria such as minimal latency or other criteria can be used).

b) The server repeats the aggregated hop count calculation of step (a) a total of 'n' times, each time with the assumption that a different peer client type is allocated to the newly added peer client.

c) The newly added peer client is assigned the peer client type that resulted in the minimal aggregated hop count calculation in steps (a) and (b).

The above method is one way of assigning peer client types to a peer client, but implementation is not limited to this method, and other ways are possible.

It is to be noted that the above method may be implemented on the entire network, or it may be implemented on several portions of the network, such that the aggregated hop count calculation and peer client type assignment are done independently for each portion.

The disclosed peer-assisted embodiments exploit Fragment-to-type rearranging sequences in order to determine how content fragments are spread among peer clients for storage. Any peer client who wishes to reconstruct the original content, must have the exact rearrangement key in order to do so. The following process discloses a method that takes advantage of this effect in order to secure the content that is stored in the peer-assisted system.

a) The control server chooses a unique key to a Fragment-to-type rearranging sequence for spreading the content fragments of a specific content. The key may be in the form of a primitive polynomial in the case that a pseudo-random primitive polynomial is used to generate the sequence, or it may be a string sequence that is used by the hash function as was given as an example above, or it may be any other key capable of generating a unique Fragment-to-type rearranging sequence.

b) The unique key is used to spread the specific content throughout the cluster of peer clients.

c) When a peer client requests from the control server to consume a specific content, the control server authenticates the identity of the peer client.

d) After authentication, the control server sends the requesting peer client the key of the Fragment-to-type rearranging sequence that was used to spread the requested content; the key is sent in an encrypted form, to be decrypted only by the requesting peer client.

e) The requesting peer client decrypts the encrypted key, and uses it to calculate the exact location of each of the fragments of the requested content.

With the above process, an unauthorized party cannot assemble the original content, since it is missing the key that can enable it to predict where the next fragment of content is located among the peer users. The content is made secure this way without the need to encrypt and decrypt the content itself, although an additional encryption of the content itself may be added in a non limiting fashion.

It is to be noted that when used in conjunction with modern video compression methods (such as, but not limited to, MPEG-2, MPEG-4 and H.264), and when using a small fragment size about the size of one video frame, the disclosed security mechanism also protects against the possibility of an unauthorized party accidentally decoding a frame or a sequence of frames of the protected content, since modern video compression methods require the information of more than one sequential frame to decode the sequence, and therefore even if one fragment is available, it cannot be used to reproduce any of the video frames.

Referring again to FIG. 4, when the described embodiments are used for the reconstruction of the streaming content, the requesting peer client may keep in its streaming buffer 520b only several content fragments ahead of the presentation point to assure the smoothness of streaming; by doing so, and by erasing any already played-back portions of the streaming buffer, the peer-assisted system assures that at no point in time there exists a sequence longer than several content fragments of any original content, since the content itself is spread among the peers prior to assembly for consumption. Without limiting the embodiments, the fragment may be at about the size of one video frame, so that practically no file sequence longer than several frames of the original content can be found in any peer client.

Referring back to FIG. 2, a supplemental streaming server 60 may be added to the cluster in order to assist its operation when the cluster is small, when temporary additional streaming capacity is needed, on operational problems, on a lack of peer clients of a specific type, or when the system operation is jeopardized. The following example describes one optional embodiment to achieve this functionality. The supplemental server 60 may be constructed from multiple independent software clients, each emulating the operation of a full peer client of a certain peer client type. All emulated clients' software may run on the same server machine, or on several machines. The emulated clients are of all peer client types in the cluster, such that all the content is stored on the supplemental server 60. The aggregated bandwidth of all emulated peer clients in the supplemental server 60 is inherently added to the cluster streaming capacity, such that each real peer client sees the supplemental streaming coming from the supplemental server 60 as regular peer clients, and therefore no changes to the peer-assisted system are required. Optionally, when clients from a certain type are missing the supplemental server may emulate the clients of the missing type.

Figure 6:
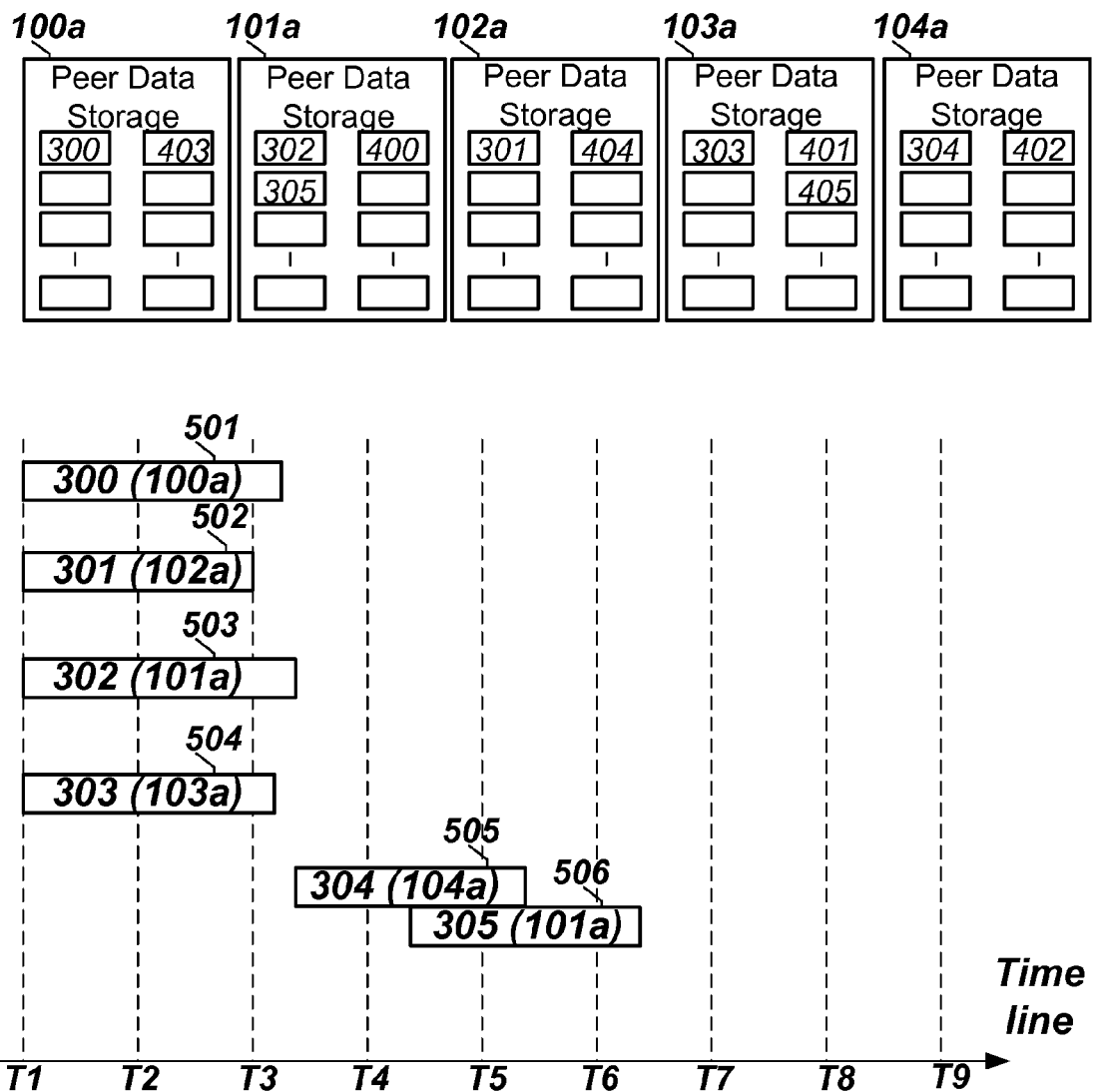

FIG. 6 illustrates a case where a peer client is retrieving approximately the maximum amount of content fragments made possible by its available downlink bandwidth, also referred to as boost phase. The boost phase is useful, for example, when starting to retrieve a new content, when implementing trick play (such as jumping to a new position within a currently played content), or after a network failure. In the illustrated boost phase, the retrieving peer client approximately simultaneously requests a plurality of content fragments (300, 301, 302, 303), and upon reception, continues with a steady state content fragment request scheme (illustrated by content fragments 304, 305). In this case, the boost phase shortens the time-to-play between the content request and actual content playing.

Figure 9:
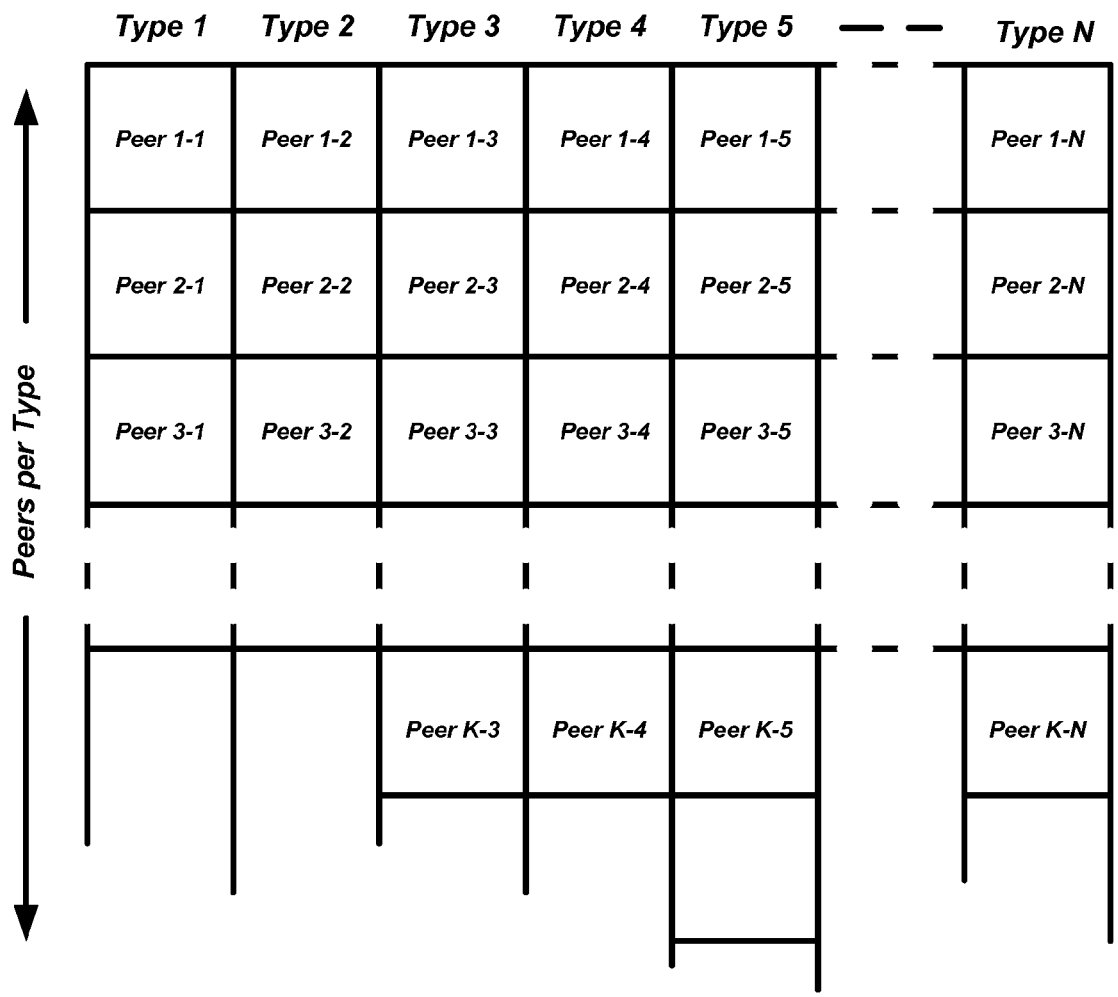
FIGS. 9-12 illustrate groups of storage-and-computing elements in accordance with some embodiments of the present invention.

FIG. 9 illustrates N types of peer clients, each peer client type is associated with a plurality of peer clients. Optionally, all peer clients associated with the same peer client type store the same information. Any group of N peer clients belonging to N distinct peer client types can be used to completely reconstruct the content stored in the cluster.

Figure 10:
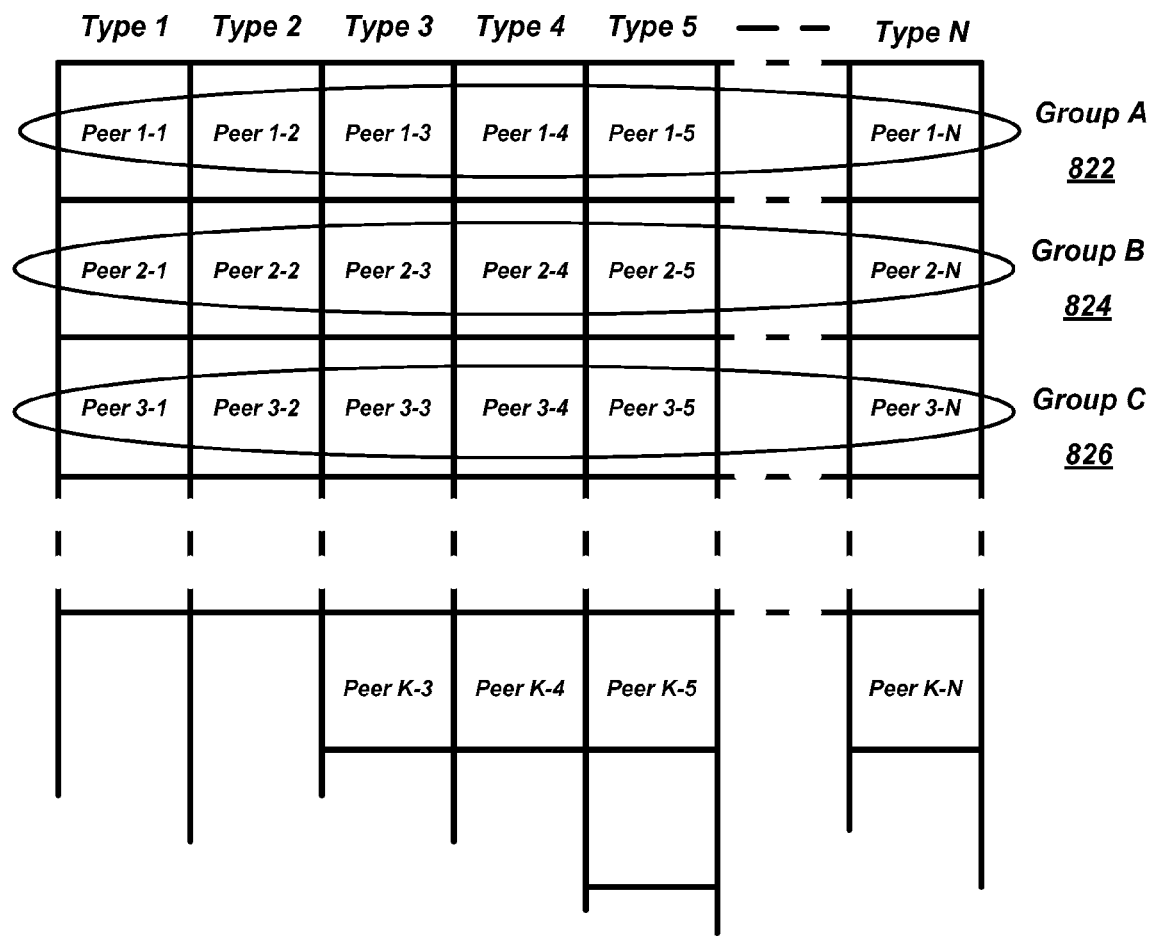

In one embodiment, illustrated in FIG. 10, a plurality of groups of peer clients are formed (Group A 822, Group B 824, Group C 826, etc.). The peer clients included in each group store together one copy of the entire information stored in the cluster. Optionally, each group is spanned by one network node, such that retrieval of content fragments between its members is transported within the span of the one network node.

Figure 11:
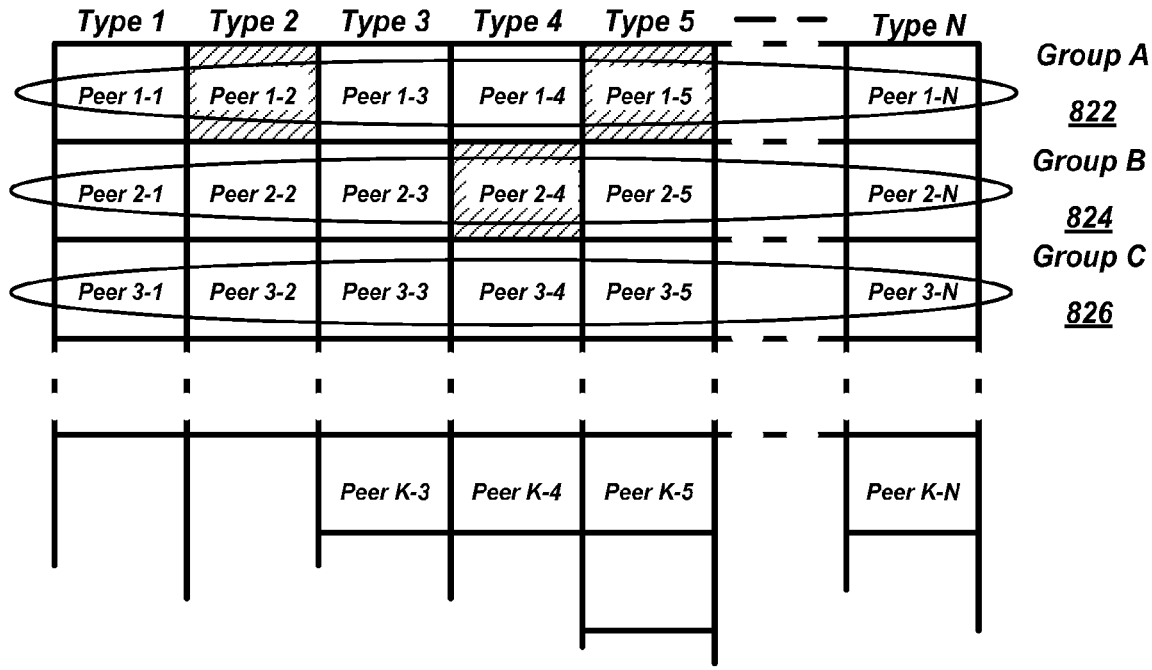

FIG. 11 illustrates an example wherein a peer client located in group A 822 is assembling a content, and first tries to retrieve the necessary fragments from peer members belonging to group A (since they are topologically closest to it). If a peer client of a certain peer client type is unavailable (illustrated in the figure as darkened peers 1-2 and 1-5), the assembling peer will look for the desired content fragment of the peer client type in other groups. For example, the content fragments that should have been available from peer 1-2 will be taken instead from peer 2-2, or possibly from peer 3-2.

Figure 12:
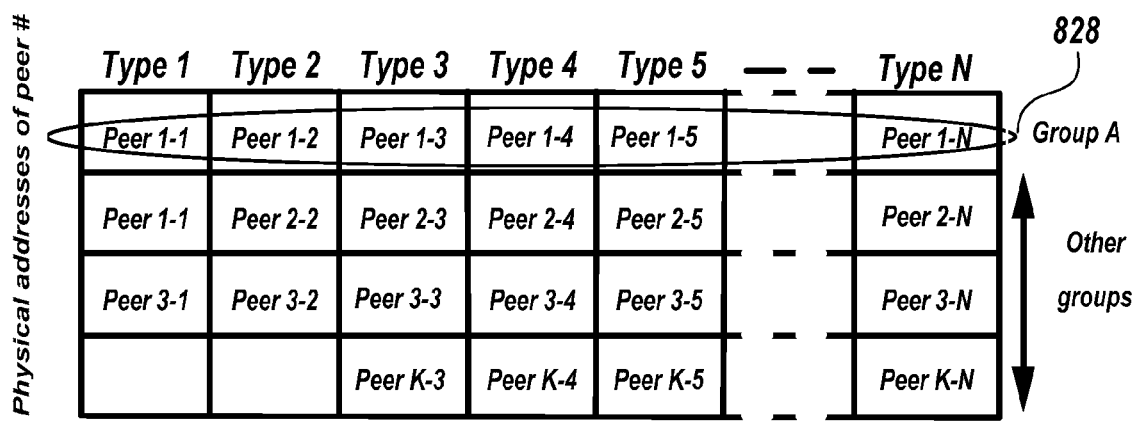

FIG. 12 is an example of a type-to-physical-address association information, illustrated as a conversion table, used by peer members of group A. In the illustrated table, each peer client entry includes the peer's physical address (optionally including a port number when implemented over the Internet). Peer clients from group A may search for content fragments in the first address line 828, corresponding to physical addresses of all peer clients belonging to group A.

Figure 13:
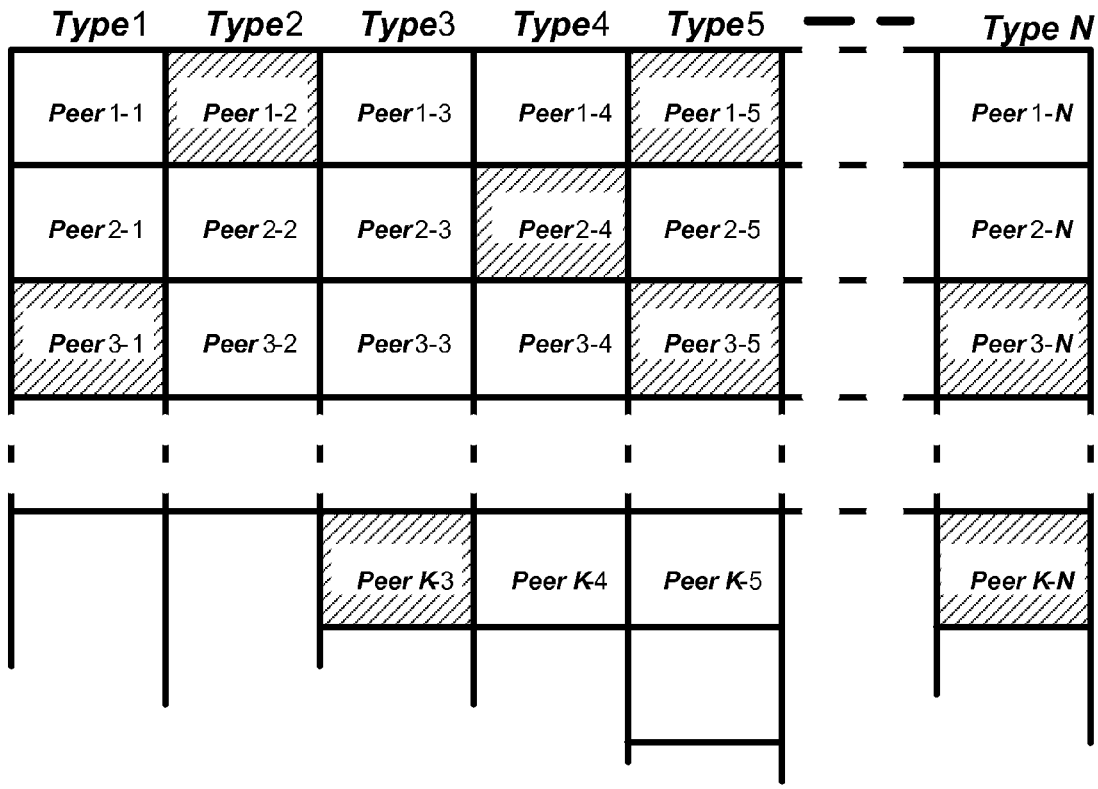
FIGS. 13-14 illustrate a locality mechanism in accordance with some embodiments of the present invention.
Figure 14:
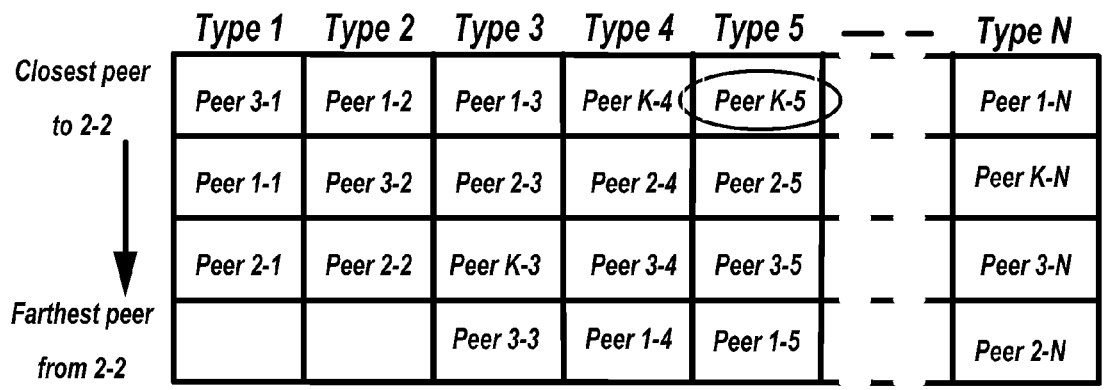

FIG. 13 illustrates one embodiment wherein the peer clients are not grouped. As an example, in that case, peer client 2-2 may retrieve a content fragment associated with peer client type 5 from peer 2-5 or K-5, or other available peer clients associated with peer client type 5 not illustrated in the figure. Optionally, peer client 2-2 makes its choice so as to minimize a cost function (also referred to as an optimization function). In the case where the cost function minimizes the number of layer-3 hops between the peer clients, peer 2-2 should select its closest available peer client, according to a network topological table as seen by the peer client 2-2. Optionally, the network topological table is derived from a general inter-connecting network topology map. FIG. 14 illustrates an example of a topological table of peer client 2-2 such that when peer client 2-2 decides which content fragment associated with peer client type 5 to retrieve, peer client k-5 is selected since it is the closest to peer client 2-2. The entries in the topological table include physical addresses in which the specific peer clients can be located.

Figure 15:
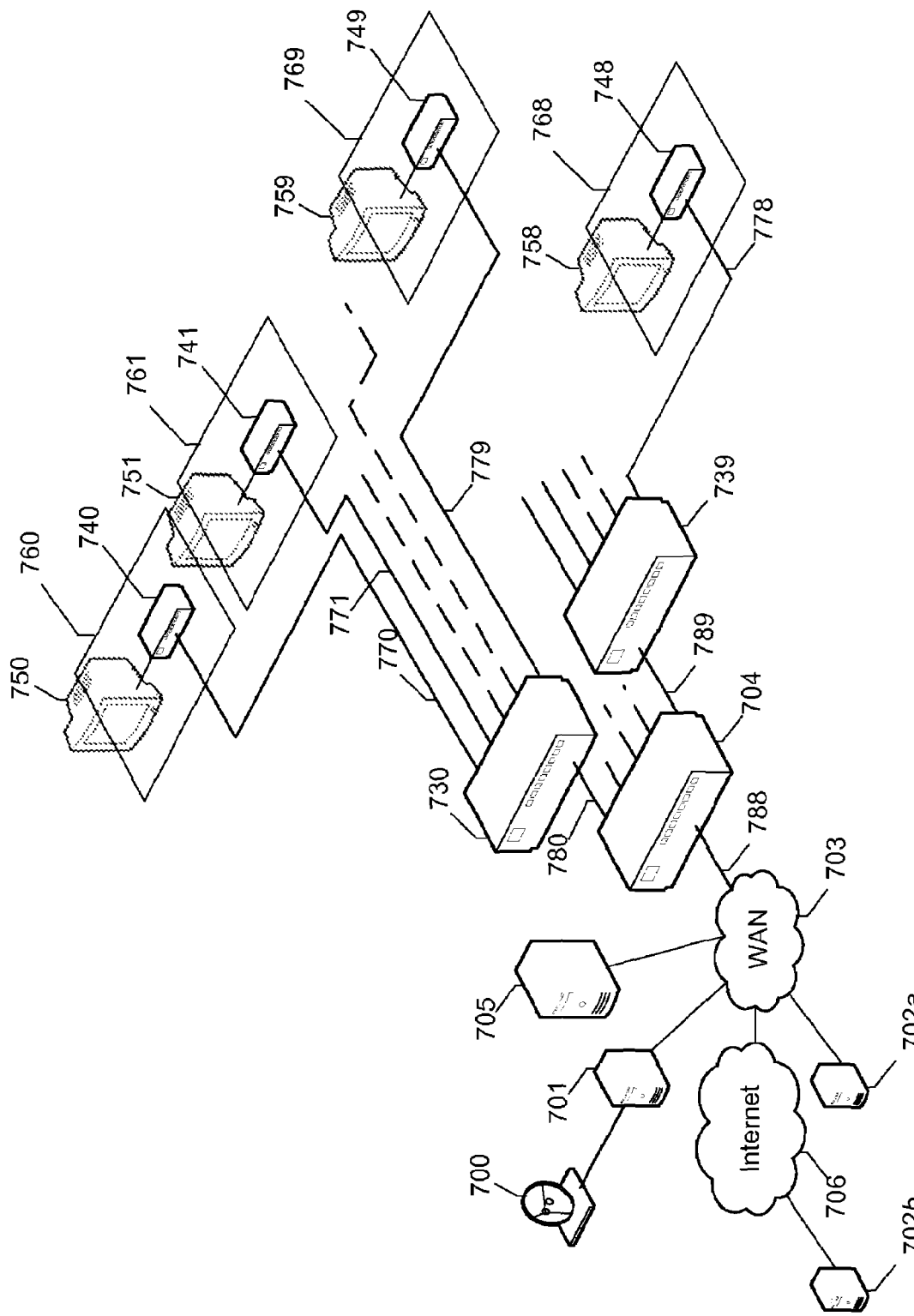
FIGS. 15-18 illustrate embodiments of peer clients spanned by one network node, in accordance with some embodiments of the present invention.
Figure 16:
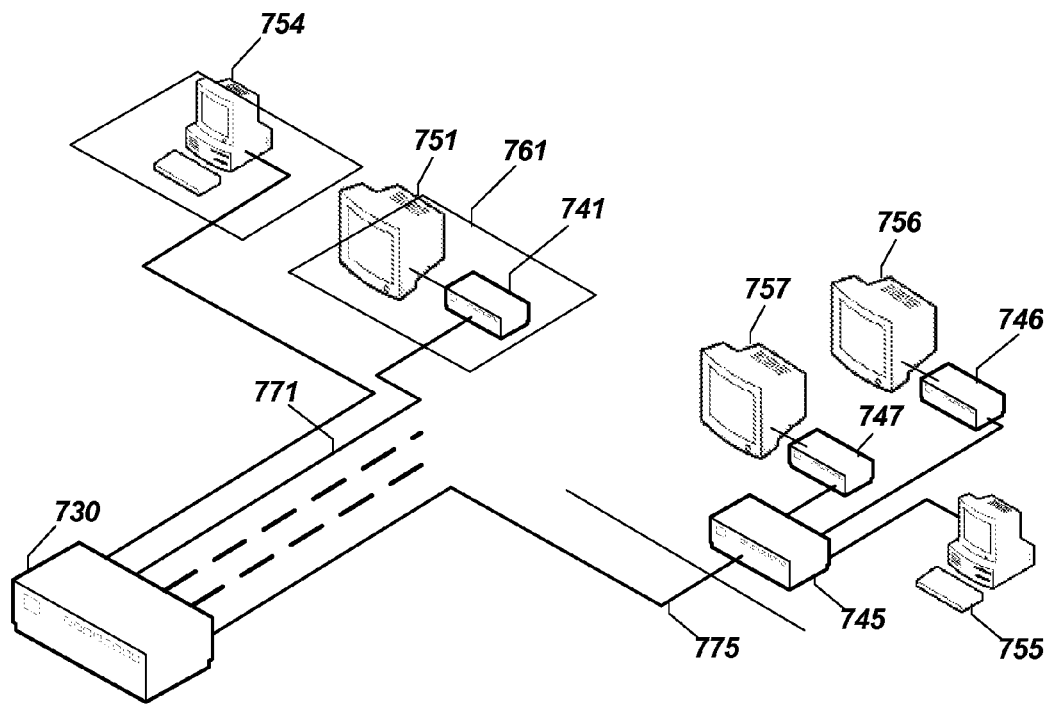
Figure 17:
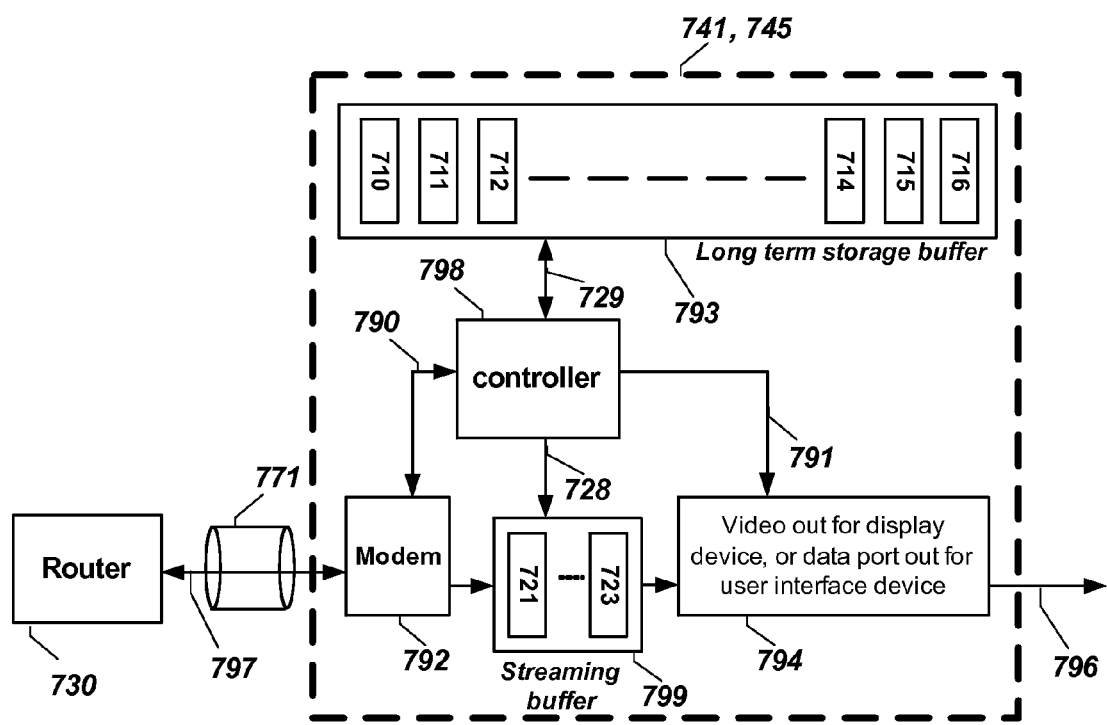

FIG. 15, FIG. 16 and FIG. 17 illustrate embodiments of systems and corresponding methods for supplying distributed stored content to end user devices that are grouped in routing clusters. The distributed stored content includes, but is not limited to, Video on Demand (VOD), streaming content and progressive download featuring fast start. The distributed content is streamed within the routing clusters from a plurality of peers to a destination peer, and by that reduces the amount of streaming load on the higher-level operator's transport network, and eliminates the need for expensive VOD streaming servers.

Referring to FIG. 15, the VOD content is distributed between the illustrated end user STB devices 740, 741, 748 and 749. Some of the VOD content may be supplied by a centralized VOD server 705. Receiving the content from STB devices may be less expensive than, and eliminate the bottlenecks associated with, distributing the content from a centralized VOD server 705, since the content routings from STBs are contained within the relatively lower levels of the network 730, 739 (such as, but not limited to, within the DSLAM, PON router, CMTS router, or wireless base station router) and last mile transport channels 770, 771, 779 and 778 (such as, but not limited to, twisted pair, fiber optics, coax, wireless or other), and do not overload the relatively bandwidth limited transport channels of higher routing levels 780, 789, 788.

The discussed systems enable a user to start viewing a streaming content within a short duration from requiring the content. And the user is not required to download the entire file before viewing it.

Optionally, initial VOD content stored on server 702*a* or 702*b* is distributed via the operator network among predetermined groups of STB devices; STBs 740, 741, 748 and 749 form such a group. It is to be understood that the STB may include any type of peer client such as, but not limited to, a computer; moreover, although only four STBs are illustrated, there may be, as a non-limiting example, 100-10,000 STBs in each group, or even more. According to this embodiment, the partitioning of all STBs into groups is determined in such a way that every STB of a certain group is connected to all other STBs in this group via a minimal routing path, such that all routing paths between the group's STBs are contained by a single access router 730 or a router that controls a group of access routers 704. Optionally, the process of partitioning is managed by the controlling server(s) 702*a* or 702*b*, which may or may not be the same server(s) that store the initial VOD content for distribution.

After partitioning the STBs into groups, the controlling server(s) 702*a* or 702*b* initiates a process of distributing the VOD content between all of the associated STBs 740, 741, 749, 748 in such a way that after the distribution process is complete, all of the VOD content for distribution is collaboratively contained in the long term storage buffers 793 of all the STBs of a group, and such that each of the groups contains a copy of all relevant VOD content. For example, if there are N groups storing the same content, then there are N complete copies of the original VOD content.

A non limiting example for the content distribution phase is as follows: in a system that contains 100,000 STBs (one per user), and that is partitioned into 100 groups of 1000 STBs, each group of 1000 STBs contains all of the VOD content, such that 100 copies of the original VOD content are produced. If we assume that the original VOD content has a total volume of 1TByte (one Tera Byte, the equivalent of about 1,000 movies), then in order for each group to contain all of the content, the average size of the long term storage buffer of each STB 793 should not be smaller than 1 Gbyte (or $\frac{1}{1000}$ of the total size of the entire VOD content of the operator's system). It is apparent that the size of the STB long term storage buffer is much smaller than the size of the total VOD content.

Optionally, the initial VOD content distribution among STBs for storage does not overload the operator's transport network. This may be accomplished, as a non-limiting example, by performing the distribution in times that the network has minimal activity, and/or by spreading the process for storage distribution across long time periods.

Optionally, the controlling server(s) 702a or 702b keeps track of which content is stored where. Optionally that list of content allocation is stored both in the controlling server(s) and in each of the STBs.

The division of the complete VOD content to many STBs of a group may be done, in a non limiting fashion, such that each STB contains several content files, one content file, a fragment of a content file, several fragments of a content file, several fragments of several content files, or several fragments of all content files, as long as the entire VOD content is collaboratively contained inside the long term storage buffers of all STBs of a group.

Each group of STBs may contain more than one copy of the entire VOD content, or a copy of only a portion of the entire VOD content in a non-limiting fashion.

It is to be noted that although the long term storage buffer 793 of STB 741 (and all other buffers of other STBs that are not illustrated) is illustrated as being contained inside the STB, it is not limited to this implementation, and other options exist. For example, the long term storage buffer may be separated from the STB, such that the STB (or any computing device, such as, but not limited to, a PC) has access to the long term storage buffer that is contained in a separate enclosure; As another example, a regular STB 747, 746 may be used, and the entire storage and processing may be done in a separate box 745 that handles all of the storage and transactions needed to realize the distributed VOD system. The separate box 745 drives the regular STB such that all mentioned VOD services are accessible to the end user.

It is to be noted that STB 741 may be implemented in its entirety by any computing device with a memory such as, but not limited to, PC 754. Another optional embodiment for the STB may be a home or office gateway 745 that has access to a storage memory (either internally, or externally); the gateway may be connected to operator's line 775 on one hand, and to the user's interactive device(s) (that may be, but are not limited to, a regular STB 747, 746, a PC 755, or an audio system of some sort) on the other hand; in this case, the gateway assumes all the functionalities that are associated and disclosed in conjunction with the described STB 741 device, such that any occurrence of the word STB or end-user-device herein also includes the possibility of a home and/or office gateway.

Optionally, after the initial VOD storage distribution is done, an ongoing process of content updating is performed in order to make sure that VOD content stored in each of the STB groups is up-to-date; in this process, only the delta of the content needs to be transported to the STBs for collaborative storage in a non limiting fashion.

After a predefined amount of the VOD content is distributed for storage to all STBs, the process of user VOD content consumption may begin. For example, a user having STB 749 may request a certain content; the request propagates to the controlling server(s) 702a or 702b, which in return send the requesting STB 749 a pointer to the location of the first fragment stored in a certain STB in the group (STB 740, for example). STB 749, now equipped with the pointer to the beginning of the desired content storage, sends a request to STB 740 to start transmitting it the desired content. In this example, the streamed content flows from STB 740 through the last mile transport channel 770 (such as, but not limited to, a xDSL twisted pair or PON fiber) and is routed by router 730 (such as, but not limited to, a DSLAM or a PON router) back into a last mile transport channel 779 that delivers the streamed content to the requesting STB 749. The resultant streaming path is clearly minimal in the sense that only low levels of the operator's transport network 770, 730, 779 are involved in the VOD content streaming process, as opposed to higher levels of the network 703, 788, 780, 789 that are not involved, thus relieving the bandwidth requirements of the operator's upper network layers. The ability to close the streaming loops at the lower levels of the transport network is an inherent characteristic of the disclosed VOD system, and it is a direct result of the process of partitioning all STBs into groups that are contained within lower levels of the network (levels that are as close as possible to the last mile routers and transport channels).

Continuing the example, the requesting STB 749 receives the first streamed VOD fragment from its peer STB 740, and displays this content on its TV 759; the following fragment of the content (if there are any) may be stored in the same STB 740, or may be stored on other STBs of the group; the requesting STB 749 is therefore directed to other fragments of the desired content by either the controlling server(s) 702a or 702b or by a pointer that is contained within the current fragment of content, which was already received.

A group may extend beyond the first routing level 730, and 739, and include a second (or higher) routing level 704; in this case, the streamed VOD propagates through several layers of the operator's network, but is still kept away from the operator's WAN 703 and high level limited bandwidth transport channels 788.

Although elements 730, 739, 704 are referred to herein as access routers, they are not limited to such and may also represent, and be referred to as an Access Network, Aggregation Network, Switching Network, or any other type of network that is deployed for the purpose of spanning a plurality of target users from a centralized point of ingress/presence. Moreover, although elements 705, 701, 703 are referred to herein as VOD server, Streaming Server, or Wide Are Network, they are not limited to such and may also represent, and be referred to as Edge routers, Network Edge, B-RAS, Core, Network Core or any other entities that constitute the elements within a network that handle content aggregation and network core transport and management.

It is to be noted that the process of VOD storage distribution and the process of VOD content consumption are described as two separate processes for clarity purposes only, and may both happen simultaneously and continuously, in a non-limiting fashion.

The controlling server(s) and the initial VOD content servers may reside in the operator premises 702a and connect to the operator Wide Are Network 703, or may alternatively reside off-site 702b, and connect to the operator network via the Internet 706; this flexibility of the disclosed VOD system is a direct result of the fact that high bandwidth and fast constrained VOD streaming processes are contained inside the STBs groups, so that no significant bandwidth or real-time requirements may be put on the controlling and initial VOD storing servers. The servers may distribute the initial VOD content to the storage endpoints (the STBs) over long times and in a non-real-time fashion, thus significantly reducing the cost of the system, the demands on the operator transport network, and also allowing for seamless scalability in number of served VOD users.

Referring to FIG. 16, in one embodiment of storing and accessing the distributed VOD content, all VOD content is fragmented to small fragments ranging, as a non-limiting example, from 0.03 to 10 seconds of streaming video memory at the controlling and initial content server(s) 702a or 702b. At the phase of VOD content distribution to the groups of end-user devices, the controlling server(s) direct the content in such a way that each end-user device 741 (such as, but not limited to, a STB, a distributed VOD device that drives a regular STB, or a PC) in the group receives some of the fragments 710, 711, 712, 714, 715, 716 of all of the content files that are in the VOD pool; the distribution of the fragments is done such that each VOD file's fragments are more-or-less evenly distributed among the end-user devices, and such that every two time-consecutive fragments of all of the VOD content files reside in two separate end-user devices. Each fragment stored in a long term storage buffer 793 of an end-user device points to the location (indicated by the end-user device within a group plus the exact fragment in its long term storage buffer) of the consecutive fragment; this way, when a user is viewing a VOD content, it can receive the current fragment, and can also immediately know from where and whom to request the next fragment of the content it is now viewing. A similar system of pointers point from one fragment to another in the opposite direction, so that "rewinding" capabilities are supported. The controlling server(s) has complete knowledge of the beginnings of each linked content list. This elaborated mechanism of linked lists of small VOD content fragments that extend throughout all end-user devices assures that almost any number of users can simultaneously ask for the same VOD content, provided that they are not viewing the exact same time fragment.

A non-limiting numerical example may further clarify the principle; a 2 hour movie is fragmented into 7200 one second fragments that are distributed among all end-user devices in a group; if there are about 1000 end-users in such a group, and the movie is extremely popular, then maybe as many as 100 viewers would like to watch it simultaneously. Since the viewers are not synchronized, there is a high probability that at any given time that a user is requesting the popular content, the first fragment that resides in a certain end-user device is free to be transmitted (100 accesses of 7200 possible fragments are very unlikely to collide). Another way of looking at this process is that at any given time, and regardless of what content is more popular, the streaming traffic among end-user devices is very strongly averaged on the last mile transport channels 770, 771, 779, such that the transport infrastructure is put to its true practical limits; this disclosed method of storing and accessing the VOD content is herein referred to as "distributed VOD stripping".

In one embodiment of the fragmented distribution, not one set of pointers is used at each fragment that points to the next fragment within a group, but rather a set of several pointers that point to several locations of the next fragment; one pointer points to the next fragment within the viewer group, and other pointers point to the locations of the same content fragment stored in other groups; this way a redundancy mechanism is realized between the groups.

When the viewing end-user 741 fetches the fragments from peer end-user devices, it may fetch more than one consecutive fragment at a time (by traversing several pointers at once to reach several consecutive fragments); the multiple fragments 721, 723 can be stored in a streaming buffer 799 for smooth and uninterrupted viewing.

In addition, FEC (Forward Error Correction) techniques may be used to encode several consecutive fragments, such that even if one or more fragments within a super-fragment FEC encoded chunk are missing, the stream can still be decoded with no skips or interruptions.

In one embodiment of the invention, all VOD content is fragmented at the controlling and initial content server(s) 702a or 702b into small fragments, ranging from 0.03 to 10 seconds of streaming video memory, as a non-limiting example. At the phase of VOD content distribution to the groups of end-user devices, the controlling server(s) directs the content in such a way that each end-user device 741 (such as, but not limited to, a STB, a distributed VOD device that drives a regular STB, or a PC) in the group receives some of the fragments 710, 711, 712, 714, 715, 716 of all of the content files that are in the VOD pool; the distribution of the fragments is done such that each VOD file's fragments are more-or-less evenly distributed among the end-user devices; a possible fragment distribution method is disclosed as follows: A pseudo-random series is chosen such that if 'm' end-user devices 741 constitute one complete content group, then the series is pointing to each member in the group in a sequence; the resulting pointing sequence seems random, but since it was created by a pseudo-random series, it is totally predictable (a non-limiting example of such a pseudo-random series is generated by a primitive-polynomial over Galois Field GF(2) of order 'n' to create a pseudo-random pointing list of cycle 2^n that is mapped into the 'm' end-user devices by performing 'modulo m' on the pointing list elements, assuming 2^n>m); the controlling and initial content server(s) 702a or 702b distributes the video stream fragments across all end-user devices of the group such that the first fragment of the stream is stored on the end-user device pointed to by the first pointing element in the pseudo-random series (for example, the first fragment of the stream is stored at memory location 710 of STB 741 that happened to be pointed to by the first element of the pseudo-random series), the second fragment of the stream is stored on the end-user device pointed to by the second pointing element in the pseudo-random series (for example, the second fragment of the stream is stored at memory location 710 of STB 749 that happened to be pointed to by the second element of the pseudo-random series), and so on and so forth with the rest of the fragments of the stream.

It is to be noted that the pseudo-random series will eventually re-point to STB 741 (for example), for storing a certain fragment of the stream at location 711, and then 712 and so on and so forth until all the stream's fragments are stored over all end-user devices of the group, and such that each end-user device of the group stores more or less the same amount of stream fragments (this is assured by using a pseudo-random fragment distribution series).

Two time-consecutive fragments have a high probability of being stored on different end-user devices (this is again assured by using a pseudo-random fragment distribution series). After the fragments are distributed, the process of VOD content consumption may begin; the requesting end-user device (say 741) is requesting a certain VOD content from the controlling server(s) 702a or 702b, which after authenticating the identity of the requesting user (or without authenticating the identity of the requesting user), sends it the information of the pseudo-random series used to distribute the requested content. This information may be as a non-limiting example the order of the GF(2) field, the exact primitive-polynomial, and the starting point of the first fragment of the desired content. This information may be sent encrypted or un-encrypted to the requesting user. The user, now equipped with the exact same pseudo-random series that was used to distribute the content fragments among the end-user devices of the group, has perfect knowledge of where each fragment of the stream resides (which end-user device of the group stores which fragment of the desired VOD stream); all it has to do is request the fragments in the correct sequence from its peer devices.

It is to be noted that the requesting device may request several consecutive fragments simultaneously from the several end-user devices that store these fragments according to the pseudo-random series; these few next fragments 721, 723 may be temporarily stored in a streaming buffer 799 in order to preserve viewing continuity. Different VOD contents may be distributed using different pseudo-random series (as a non-limiting example by changing the order of the GF(2) field, the exact primitive-polynomial, or the starting point of the first fragment of the desired content, or a combination of all or some of the above). The method of pseudo-random fragment distribution and consumption may have the following advantages for a distributed VOD storage system.

(i) Since time-sequential fragments reside in several different end-user devices, the requesting end-user device can use the accumulated upload bandwidth of several devices to support high streaming bandwidths; a non limiting example is an ADSL line that is limited in upload bandwidth to about 0.5-1 Mbps; in this case, the requesting end-user device may simultaneously request the next 20 fragments, for example, which with high probability reside in 20 different end-user devices, and therefore the effective streaming upload bandwidth is immediately increased from 0.5-1 Mbps to 10-20 Mbps (which is capable of supporting HDTV VOD streaming for example); the latency of requesting 20 fragments, for example, is still small for very small fragments (0.03 Seconds per fragment, which is about one frame per fragment, as a non limiting example) and is equal to about 20×0.03=0.6 seconds (as a non-limiting example), which is very much acceptable for VOD content delivery.

(ii) Since a VOD content may be fragmented into thousands or even hundreds of thousands of small fragments (as non limiting examples), and since all these fragments are pseudo-randomly distributed over all end-user devices in a group, then it is possible for any number of users within the group to simultaneously request to view the same VOD content, each with a different and unique time shift. This happens because assuming a minimal time shift between user requests, all streaming information is very strongly averaged between all end-user devices, effectively creating an aggregated streaming capability equal to the total aggregated upload capacity of all end-user devices, which scales as the number of devices grows, and all this with only one copy per VOD content. In other words, there is no need to store several copies of the content to allow multiple streaming events per content.

(iii) Different VOD contents may be distributed using different pseudo-random sequences, which allows many users to see many different VOD contents simultaneously, while assuring that all end-user devices contribute to the streaming effort, and eliminating the possibility of momentary congestion in streaming requests from any one end-user device; this is assured by the fact that different pseudo-random sequences have low correlation between themselves.

(iv) Since all viewing users use pseudo-random sequences to accurately know from which end-user devices to request the fragments of a stream, there is no need for a central point of coordination and location services; this fact allows the system to use very small fragments, which otherwise might have resulted in impossible management load for a central coordination server; in a non-limiting example of a group of 1000 end-users, and using 0.03 second fragments, assuming all users consume a VOD stream results in 1000*1/0.03=33,000 management requests from a central server per second, per group. All this is avoided by the disclosed method.

(v) Since the end-user can use the pseudo-random sequence to predict the exact location of all fragments of a VOD stream, it is very easy to jump forward or backward in the steam by simply calculating the location of the wanted time-shifted fragment. For example, if 0.03 second fragments are used, and the user wants to move 5 minutes forward in the movie, the end-user device simply needs to calculate where the fragment that is 5*60/0.03=10,000 fragments away is located, and continue from there. A time stamp per fragment may be used to help locate the wanted time-shifted fragment within the calculated specific end-user device.

(vi) Optionally, if only authenticated users can receive the pseudo-random sequence generation parameters of a VOD stream, this constitutes for protection against unauthorized access to the VOD content. A user that does not have the pseudo-random sequence generation parameter of a certain VOD content, cannot know where to look for the fragments of this content.

It is to be noted that the disclosed advantages in using pseudo-random fragment distribution and consumption may also be applied to the in-fragment pointer-based system described above, provided that the pointers within fragments point to other fragments in a way that mimics pseudo-random behavior.

It is also noted that non-pseudo-random sequences (linear sequences for example) may be used as well, but may result in a less efficient operation of the system.

The following is a non limiting example of a method for network discovery. In one embodiment of an operator network deployment of the distributed VOD system, the groups of end-user devices can easily be deduced from the construction of the network; but when such information is not available (for example when the system is installed without cooperation with the network operator), the following method may be used. Every end-user device in the network sends a packet of data to all other users, and measures the time it takes for all responses; the user then sends this information to the controlling server(s) for registration, which in turn use it to determine the minimal routing groups.

It is to be noted that although the partitioning of STBs into groups was disclosed as a process that is aimed at creating groups of STBs with minimal routing paths, partitioning is not limited to this implementation, and there are other methods and ways to partition the STBs (or any other end-user devices). A non limiting example of a grouping strategy is grouping by content types; in this case, the end-user devices are grouped such that every group represents a special content interest group (for example old movies group and Sci-Fi group in a non limiting fashion), such that content transport between the group's members has a high probability of answering the viewing preferences of the group. There is a tradeoff between the minimum routing criterion and other criterions such as interest group as an example, and the operator has the flexibility to decide how to balance his grouping selection method. Other partitioning strategies may be sought, like time of viewing, or others in a non-limiting fashion.

The following embodiment discloses a method of distributing the storage of broadcasting channels content to end user devices that are grouped in minimal routing clusters. The distributed content is then streamed within the routing groups from the group of peers to the end target peer, and by that increases the duration of channel recording.

In one embodiment, predetermined groups of inter-connected STB devices are formed. Referring to FIG. 15, STBs 740, 741, and 749 may form such a group. The partitioning of all STBs into groups is determined in such a way that every STB of a certain group is connected to all other STBs in this group via a minimal routing path, and such that all routing paths between the group's STBs are contained by a single access router 730 or a router that controls a group of access routers 704. The process of partitioning may be managed by the controlling server(s) 702a or 702b.

In this example, the operator broadcast channels are received by a central regional receiver 700 and are then delivered to a streaming server 701 that streams this content to any requesting end user STB 740, 741, 749, and 748. In addition to the directly streamed broadcast channels, a process of simultaneously recording all of the broadcast channels into the long-term storage buffers inside all the STBs in a group 740, 741, 749 may occur. When a specific user decides to drop from direct broadcast view into a delayed and/or recorded broadcast view, it is directed by the controlling server(s) 702a or 702b to start viewing a recorded stream from the STBs that happen to hold the desired time fragment of the viewed delayed broadcast. The simultaneous recording process is managed by the controlling server(s) 702a or 702b, such that broadcast channel streams arriving from the streaming server 701 are directed for distributed recording among all STBs of a group, and such that all groups of STBs contain their own copy of the broadcast channels. Optionally, the controlling server(s) 702a or 702b keep track of which channel is stored where.

Optionally, a specific period of recording is determined for each recorded broadcast channel, such that the distributed recording of each channel is wrapped around after this period of time.

As a non limiting example, a group of STBs contain about 1000 STB devices, with 1 Gbyte of storage memory per STB. Assuming that about 20 broadcast channels are recorded, an average of about 50 hours of channel history can be recorded for all 20 broadcast channels. This volume of recording is much larger than anything that can usually be recorded independently by a single recording-enabled STB. Each STB may contain several channels, one channel, fragments of a channel, fragments from a plurality of channels, fragments of all channels, or any other combination as long as all the required broadcast channels are collaboratively contained inside the long term storage buffers of all STBs of a group.

It is to be noted that by using small fragments for distributive recording of broadcasted channels (0.03 seconds per fragment as a non-limiting example), it is possible to mimic multicasting broadcast operation as follows. All broadcast channels are recorded as disclosed above; a user that wants to see a specific broadcast channel asks the controlling server(s) 702a or 702b for a micro time-shift slot. The server allocates a slot for the user that starts viewing the channel with a time-shift that is equal to the slot allocation. Each slot is one fragment in duration (say 0.03 seconds), so that all users viewing a certain channel are allocated different slots, and since different fragments (slots) are contained in different end-user devices, the number of end-user devices that participate in the streaming is at least equal to the number of viewers of the channel per group, and can therefore easily share the load of streaming the broadcast channel to all requesters. Since the fragments are small, the resulting micro time-shift of the viewers is kept at minimum (typically 1-3 seconds), so that the viewing experience is similar to actual viewing of a real-time multicast stream, but without the need for actual multicasting duplication from the source stream.

In an embodiment of the invention, a stable broadcast tree topology is used for content fragments distribution. In one embodiment of the invention, stable broadcast tree topology and STB node grouping into minimal routing groups, facilitate the creation of a peer-to-peer broadcasting system that reduces the streaming requirements from a central streaming server, and puts the heavy load of simultaneously broadcasting to virtually any number of users into the hands of end node devices.

Figure 18:
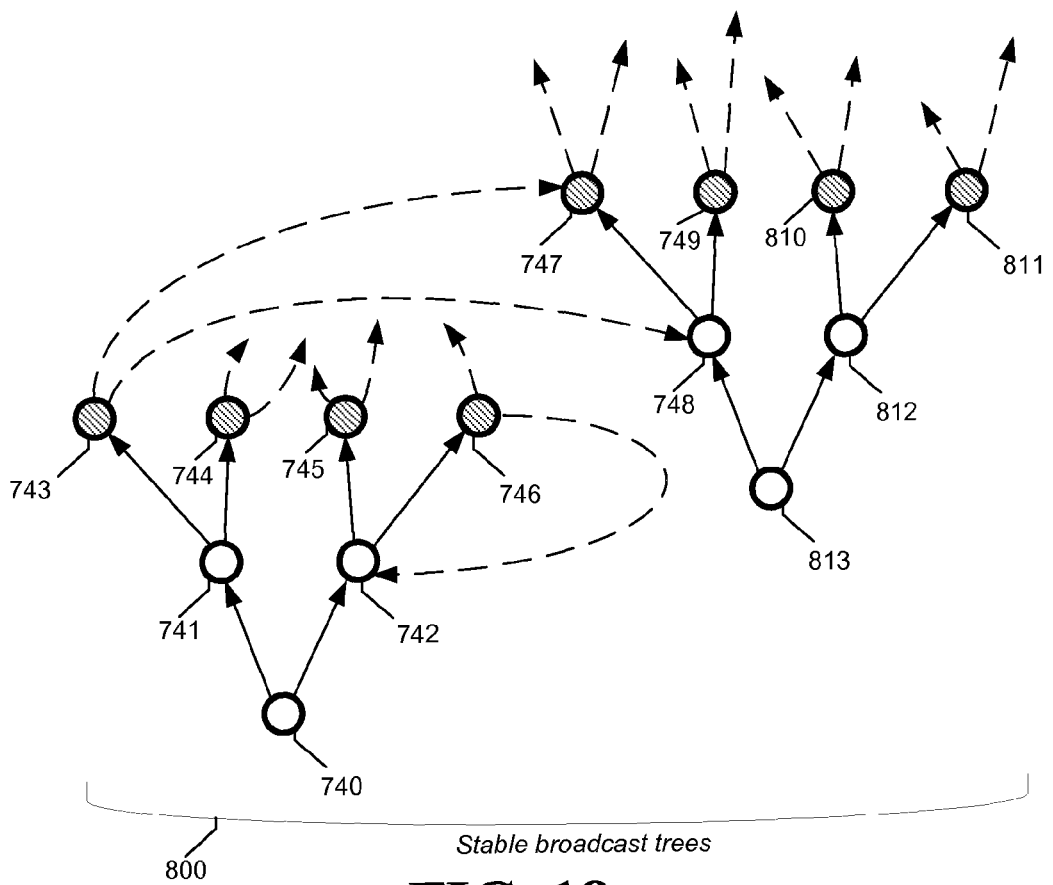

Referring to FIG. 18, in a stable broadcasting tree topology 800, only the end nodes (leafs) of the trees 743, 744, 745, 746 and 747, 749, 810, 811 are streaming the content to the requesting (viewing) users, illustrated in FIG. 18 by 742, 747, and 748. All other nodes 740, 741, 742, and 813, 748, 812 that are not leafs in the broadcasting trees 800 are just being used as relay nodes that facilitate the exponential creation of multiple broadcasting sources.

Since each leaf node in the broadcasting tree can serve at least two users, it is guaranteed that all participating nodes in the trees can be served. For example, without limiting the embodiments, a broadcasting tree having n layers (the illustrated tree 800 has three layers) will have a maximum of $(2^n)-1$ nodes and $2^{(n-1)}$ leafs. Since each leaf may support 2 viewers, the tree may support a maximum of $2*2^{(n-1)}=2^n$ users; but since there are only $2^n-1$ users (nodes), there will always be one more stream than users. Therefore, the leafs can support the entire tree.

In the illustrated stable broadcast trees 800, even though user 742 can view the stream that is directly provided by user 740, it is according to the stable tree topology that user 742 just relays the stream to users 745 and 746, and only the leaf user 746 redirects the stream back to user 742 for viewing. This gives the tree an inherent stability, since if now user 742 decides to stop viewing the stream, it will still direct the stream to the upper nodes in the tree. Similarly, user 748 is a part of a neighboring streaming tree, and as a stable tree node, this user is acting as a relay to the stream that comes from user 813 to the upper layer users 747 and 749, but it is not viewing this stream, but is rather viewing another stream that is transmitted to it by the leaf node 743 of the first tree; this way, when user 748 loses interest in viewing the stream that comes from user 743, it has no effect over the neighboring tree stability, since the relaying process was completely decoupled from the viewing process.

In one embodiment of the invention, users are partitioned into minimal routing groups. Referring again to FIG. 15, in one embodiment, predetermined groups of inter-connected STBs devices are formed; STBs 740, 741, and 749 form such a group (three such STBs are illustrated, but there may be, for example, 100-1000 STBs in each group). The partitioning of all STBs into groups is determined in such a way that every STB of a certain group is connected to all other STBs in this group via a minimal routing path, and typically such that all routing paths between the group's STBs are contained by a single access router 730 or a router that controls a group of access routers 704. Optionally, the process of partitioning may be managed by the controlling server(s) 702a or 702b.

The peer-to-peer broadcasting tree 800 formed inside such groups of STBs 740, 741, 749, such that each STB is a node of the tree. Since the node's connectivity is to other nodes within a group, all tree branches that transport the broadcasts are contained within the group, and enjoy the low latency and high bandwidth associated with these transport channels 770, 771, and 779.

A group may extend beyond the first routing level 730, 739, and include a second (or higher) routing level 704; in this case, the streamed peer-to-peer broadcast channels propagate through several layers of the operator's network, but they are still kept away from the operator's WAN 703 and high level limited bandwidth transport channels 788.

After the STBs are partitioned into groups, the controlling server(s) 702a or 702b decide how to construct the peer-to-peer broadcasting tree, such that the initial broadcasting stream that is received by the streaming server 701 is directed by the controlling server(s) to the first broadcasting node in a group (STB 740, for example, which becomes the head node), and such that the first node (740) serves two additional nodes and so on until the entire broadcasting tree is mapped into all participating STBs.

The fact that the entire broadcast tree is maintained by the STBs in the group lowers the costs and requirements from the centralized streaming server 701, which instead of streaming the content to all end points at the same time, now only needs to stream content to several tree starting points; the rest is done by the tree nodes that are the STBs. It is also to be noted that this peer-to-peer grouped broadcasting allows for seamless scalability, since new STB users need only register and become a part of the broadcast tree.

It is also to be noted that even though STB 741 and all other STBs are depicted as being directly connected to a display device, and are performing the distributed broadcasting themselves, implementation is not limited to this option, and other options exist, for example the option of separating the distributed broadcasting section from the STB, such that the STB (or any computing device, such as, but not limited to, a PC) has access to this distributed broadcasting function that is contained in a separate enclosure.

It is to be noted that any STB can be implemented in its entirety by any computing device, such as, but not limited to a PC. It is also to be noted that another possible embodiment of an STB is a home or office gateway that implements the distributed broadcasting functionality; the gateway may be connected to the operator's line on one side, and to the user's interactive device(s) (that may be, but is not limited to, a regular STB, a PC, or an audio system of some sort) on the other side; in this case, the gateway assumes all the functionalities that are associated and disclosed in conjunction with the described STB 741 device, such that throughout this patent application any occurrence of the word STB or end-user-device also includes the possibility of a home and/or office gateway.

Figure 19A:
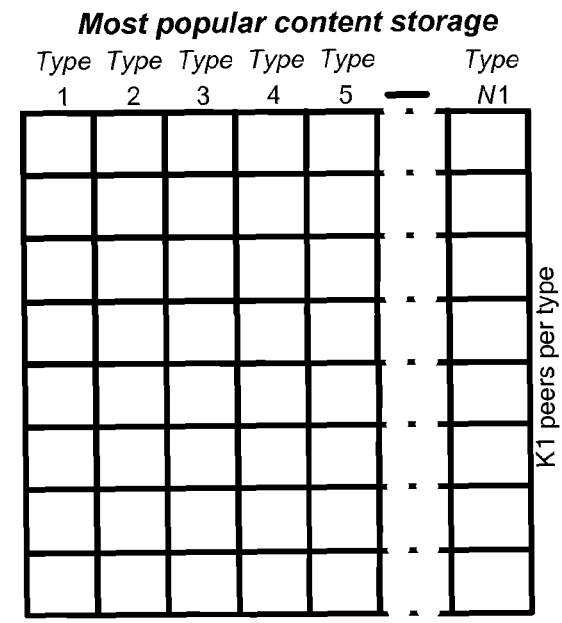
FIGS. 19A-19B illustrate popularity clusters in accordance with some embodiments of the present invention.
Figure 19B:
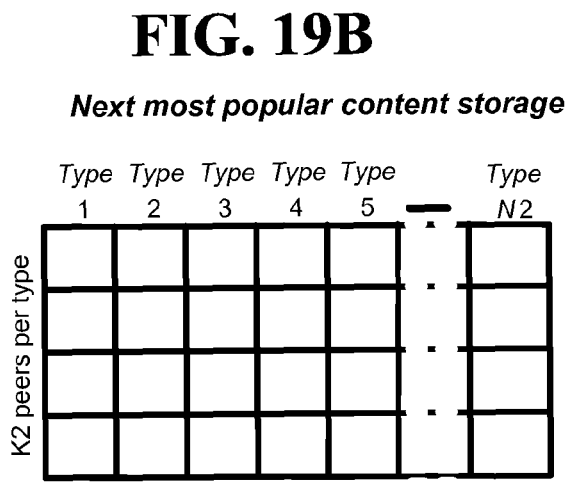
Figure 20:
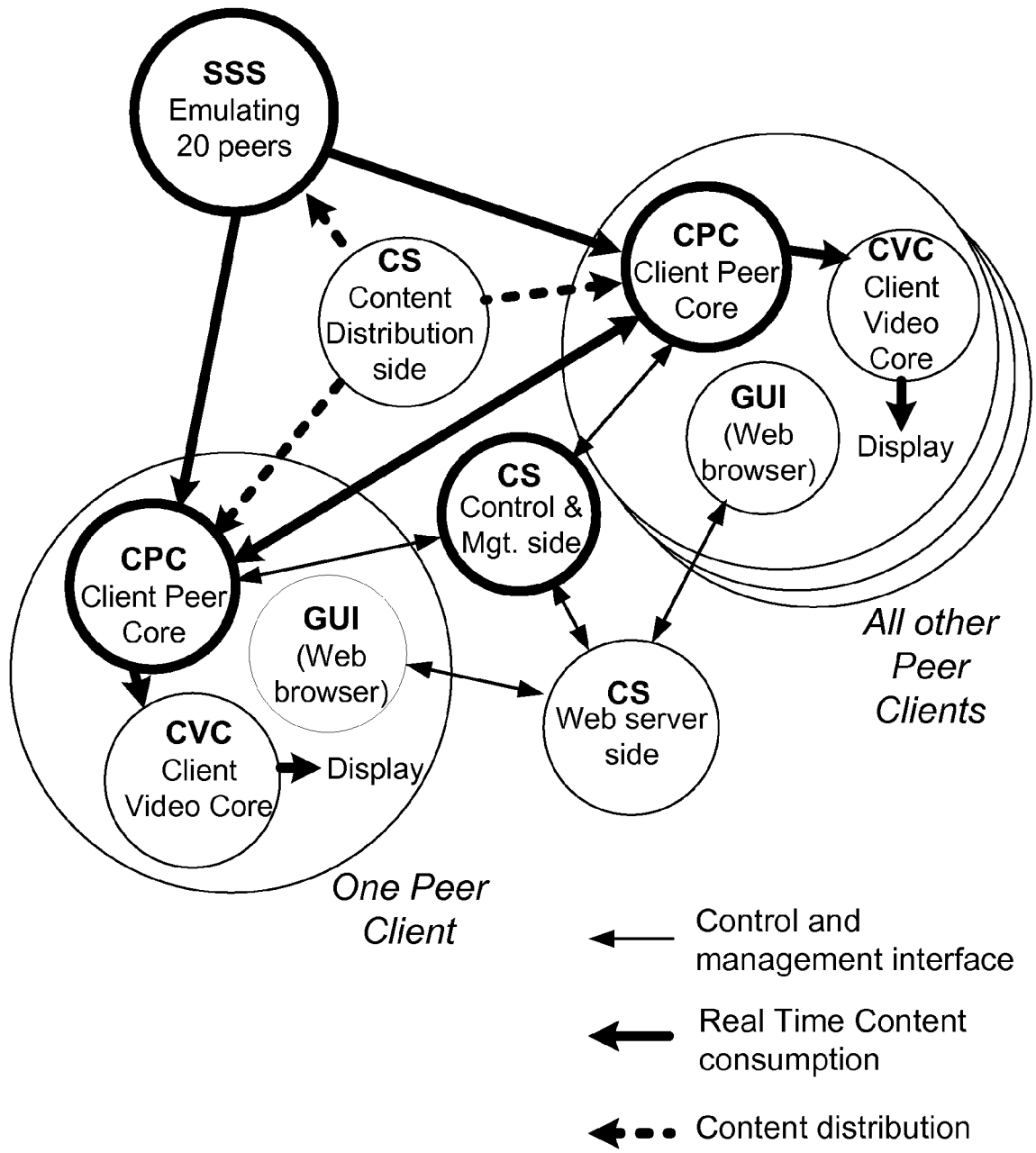
FIG. 20 illustrates a supplementary streaming server in accordance with some embodiments of the present invention.

FIGS. 19A and 19B are a non limiting example of two clusters having different sizes. Each peer client associated with the first cluster has approximately S1 storage volume allocated for storing content fragments. Each peer client associated with the second cluster has approximately S2 storage volume allocated for storing content fragments.

A plurality of unique contents are stored in the first cluster and are fragmented; each peer client belonging to a certain type stores a certain portion of all the fragments; the aggregated volume of all contents stored in the first cluster is approximately equal to S1 times N1. A plurality of unique contents are stored in the second cluster and are fragmented; each peer client belonging to a certain type stores a certain portion of all the fragments; the aggregated volume of all contents stored in the second cluster is approximately equal to S2 times N2.

Any peer client associated with the first cluster can assemble any unique content that is stored in the first cluster and any unique content that is stored in the second cluster. Any peer client associated with the second cluster can assemble any unique content that is stored in the second cluster and any unique content that is stored in the first cluster.

All of the contents to be stored in the first and second clusters are sorted by expected or measured popularity, and the most popular contents that fit into an aggregated volume of S1 times N1 are uniquely distributed for storage in the first cluster, and the rest of the contents that fit into an aggregated volume of S2 times N2 are uniquely distributed for storage in the second cluster.

The ratio of (S1 times N1) to (S2 times N2) is pre-selected as to support a ratio of (S1 times N1) to (S2 times N2) between the volume of unique contents stored in the first cluster and the volume of unique contents stored in the second cluster. The first cluster has approximately K1 peer clients per approximately each type and the second cluster has approximately K2 peer clients per approximately each type. K1 and K2 are selected such that the ratio of (K1 times N1) to (K2 times N2) is approximately equal to the expected or measured ratio of all aggregated streaming throughput averagely generated by peer clients retrieving contents stored in the first cluster to the aggregated streaming throughput averagely generated by peer clients retrieving contents stored in the second cluster.

Figure 21:
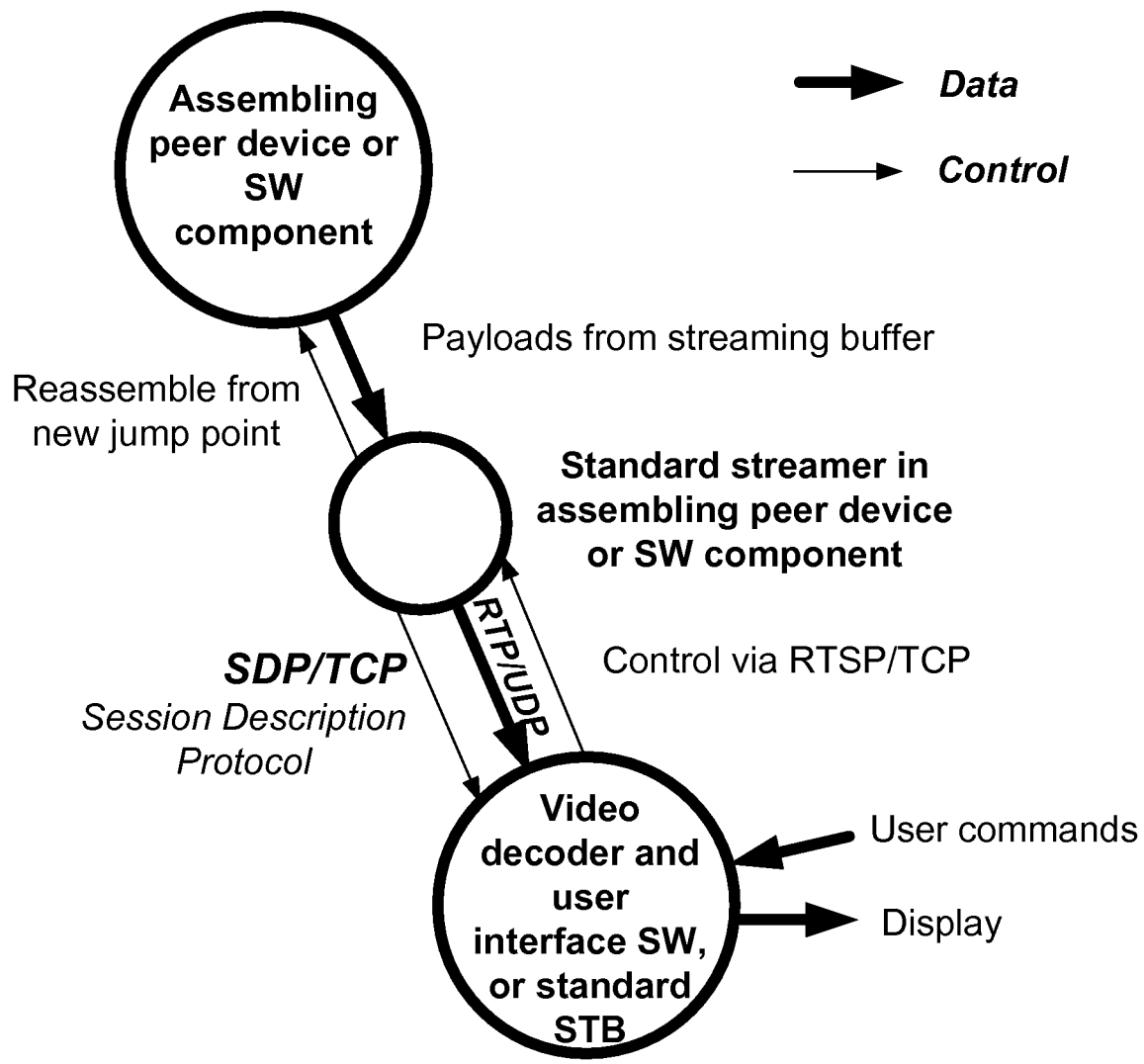
FIG. 21 illustrates another embodiment in accordance with the present invention.

FIG. 21 illustrates one embodiment wherein a user commands a standard STB to play content. The STB contacts an assembling peer client of software component, and requests the content. Optionally, the request is via a standard RTSP/TCP protocol. FIG. 21 illustrates the assembling peer client or software component assembling the requested content, and streaming it to the STB via the RTP/UDP streaming protocol.

Figure 23:
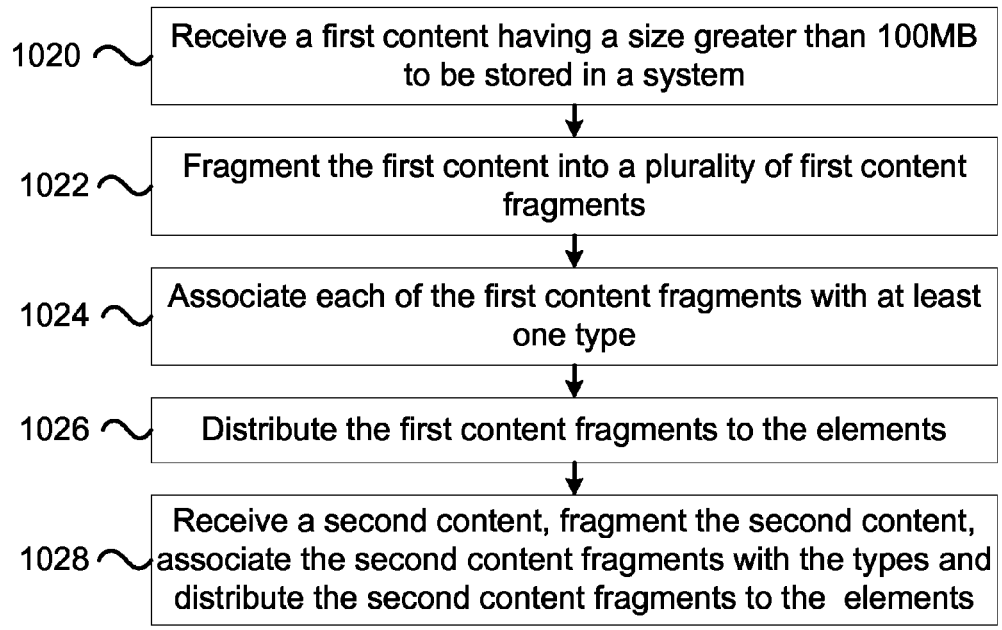

Referring back to the drawings, FIG. 23 illustrates embodiments comprising the following steps: In step 1020, receiving a first content having a size greater than 100 MB to be stored in a distributed storage system comprising a plurality of storage-and-computing elements; In step 1022, fragmenting the first content into a plurality of first content fragments, each sized no more than 64 KB; In step 1024, associating each of the first content fragments with at least one storage element type, selected from a first set of storage element types that includes at least 20 storage element types, according to a first fragment-to-type association information; And in step 1026, distributing the first content fragments to the storage-and-computing elements according to type-to-physical-address association information.

Optionally, the received content having a size greater than 100 MB is a video streaming content that comprises at least two data files. It is to be understood that this embodiment refers to the full original size of the streaming content, whether or not it is divided into one or more data files. e.g. for the purpose of this embodiment, 10 files of 10 MB each which belong to the same streaming content are regarded as one file of 100 MB. In one embodiment, the maximum size of the aggregated received content is a function of the available storage aggregated space in the storage-and-computing elements divided by the number storage-and-computing element types. Alternatively, the extra data that cannot be stored in the system is stored in an additional cluster that is associated with additional storage-and-computing element types.

Optionally, the fragments of all contents are associated with storage element types according to the same fragment-to-type association information. Alternatively, the fragments of different contents are associated with storage element types according to different fragment-to-type association information.

Optionally, the embodiments further comprise the steps 1028 of receiving a second content, fragmenting the second content, associating the second content fragments with the storage element types according to the first fragment-to-type association information, and distributing the second content fragments to the plurality of storage-and-computing elements according to the type-to-physical-address association information.

Optionally, the embodiments further comprise the steps of receiving a second content, fragmenting the second content, associating the second content fragments with the storage element types according to a second fragment-to-type association information, and distributing the second content fragments to the plurality of storage-and-computing elements according to the type-to-physical-address association information.

Optionally, the embodiments further comprise the steps of receiving a second content, fragmenting the second content, associating the second content fragments with a second set of storage element types according to a second fragment-to-type association information; and distributing the second content fragments to other storage-and-computing elements according to a second type-to-physical-address association information.

Optionally, the embodiments further comprise the step of determining the minimal number of storage-and-computing elements required to completely store a predetermined amount of data.

Figure 27:
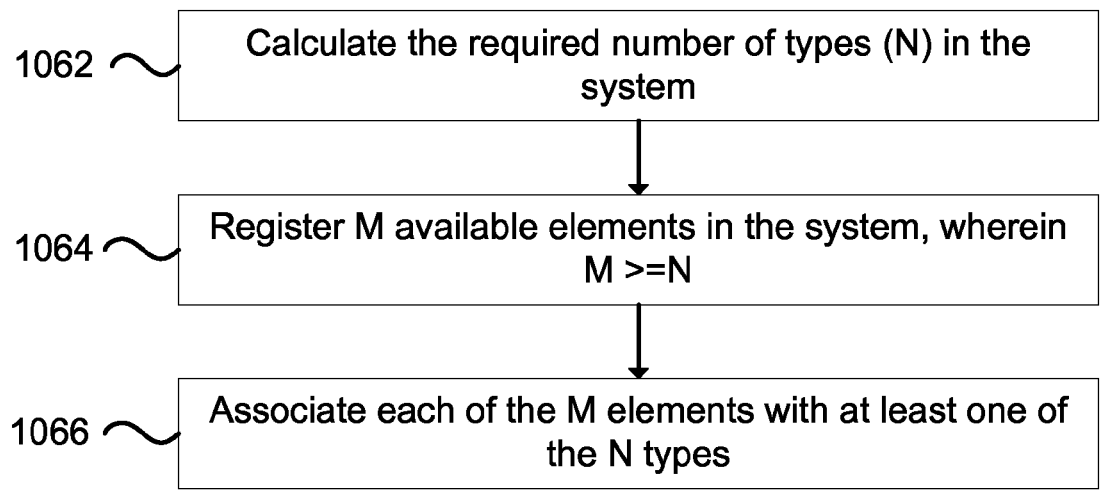

Referring back to the drawings, FIG. 27 illustrates embodiments wherein determining the minimal number of storage-and-computing elements comprises the steps of:

In step 1062, calculating the required number of storage element types (N) in the distributed storage system as the ceiling of (A/MAS), wherein A is the total aggregated size of the contents to be stored in the distributed storage system, including overhead, and MAS is the minimal storage allocation required from a participating storage-and-computing element;

In step 1064, registering M available storage-and-computing elements in the distributed storage system, wherein M>=N, and the storage-and-computing elements are accessed via Internet protocol;

And in step 1066, associating each of the M storage-and-computing elements with at least one of the N storage element types.

Optionally, predefined storage element types are associated with more storage-and-computing elements in relation to the other storage element types. These predefined storage element types may hold specific information such as key frames, highly consumed content sections, etc.

Figure 28:
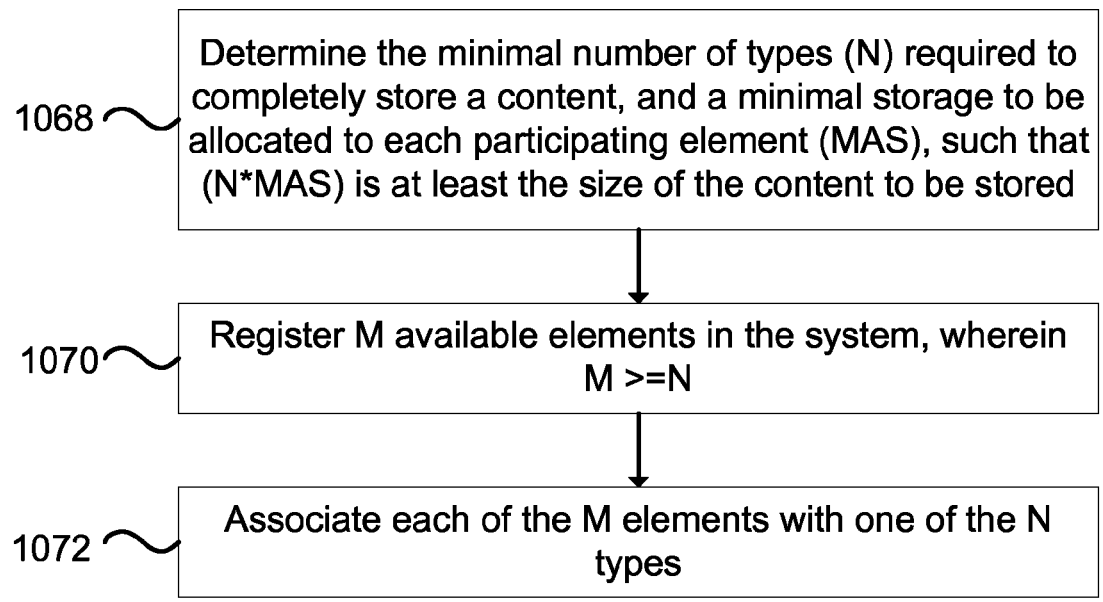

Referring back to the drawings, FIG. 28 illustrates embodiments wherein determining the minimal number of storage-and-computing elements comprises the steps of:

In step 1068, for each content to be stored, determining the minimal number of storage elements types (N) required to completely store the content, without any duplication of data between the N storage element types, and the minimal storage to be allocated to each participating storage-and-computing element (MAS), such that (N*MAS) is at least the size of the content to be stored;

In step 1070, registering M available storage-and-computing elements in the distributed storage system, wherein M>=N;

And in step 1072, associating each of the M storage-and-computing elements with one of the N storage element types.

Figure 24:
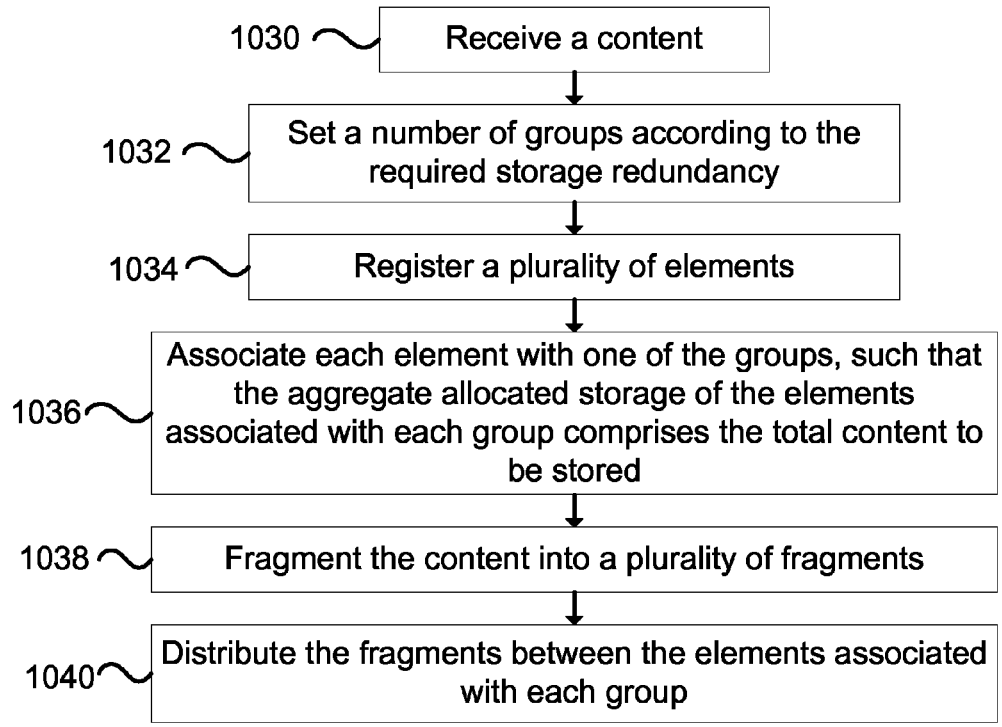

Referring back to the drawings, FIG. 24 illustrates embodiments comprising the following steps: In step 1030, receiving a first content having a size greater than 100 MB to be stored in a distributed storage system; In step 1032, setting a number of groups according to the required storage redundancy; In step 1034, registering a plurality of storage-and-computing elements that are accessed using Internet protocol; In step 1036, associating each storage-and-computing element with one of the groups, such that the aggregate allocated storage of the storage-and-computing elements associated with each group comprises the total content to be stored; In step 1038, fragmenting the first content into a plurality of first content fragments, each sized no more than 128 KB; And in step 1040, distributing the first content fragments between the storage-and-computing elements associated with each group according to a distribution function associated with each group.

Optionally, the embodiments further comprise receiving a second content having a size greater than 100 MB; fragmenting the second content into a plurality of second content fragments, each sized no more than 128 KB; and distributing the second content fragments between the storage-and-computing elements associated with each group according to a distribution function associated with each group.

Figure 25:
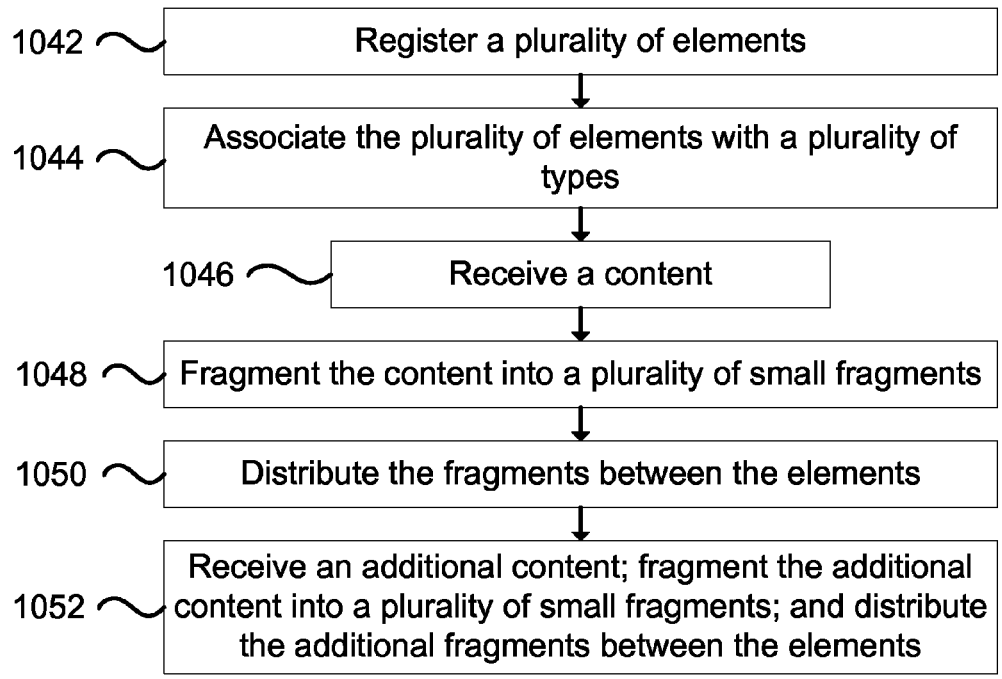

Referring back to the drawings, FIG. 25 illustrates embodiments comprising the following steps: In step 1042, registering a plurality of storage-and-computing elements that are accessed via Internet protocol; In step 1044, associating the plurality of storage-and-computing elements with a plurality of storage element types; In step 1046, receiving a streaming content having a size greater than a predefined size; In step 1048, fragmenting the streaming content into a plurality of small content fragments; And in step 1050, distributing the content fragments between the storage-and-computing elements according to a distribution function.

Optionally, the distribution function features a low autocorrelation and a low correlation with other distribution functions used by the distributed storage system. In general, as the distribution function's autocorrelation and correlation with other distribution functions are lower, the distributed storage system may provide better performances.

Optionally, the distribution function distributes the content fragments approximately homogeneously between the relevant storage-and-computing elements.

Optionally, the selected distribution function distributes the results among all of the storage-and-computing elements. Alternatively, the selected distribution function distributes the results among a predefined set of the storage-and-computing elements.

Optionally, the distribution function is a pseudo random sequence with a primitive polynomial.

An example for a linear distribution function is mapping fragment number to storage-and-computing elements number modulo N wherein N is the number of participating storage-and-computing elements, i.e. FragmentNumber=>modulo(N, FragmentNumber Optionally, the embodiments further comprise the step of receiving or determining the distribution function prior to the step of distributing the content fragments.

Optionally, the distribution function comprises a translation mechanism between the various content fragments and their associated storage-and-computing element IP addresses or IP addresses and port numbers. Optionally, the translation mechanism comprises at least one IP address for each content fragment.

Optionally, the embodiments further comprise the step of setting a minimal required storage space of each of the storage-and-computing elements, whereby each of the storage-and-computing elements has at least the minimal amount of storage available locally;

Optionally, the number of content fragments distributed to each of the storage-and-computing elements is proportional to its available storage space or to its bandwidth.

Optionally, the embodiments further comprise the steps 1052 of: receiving an additional streaming content; fragmenting the additional streaming content into a plurality of small content fragments; and distributing the additional streaming content fragments between the storage-and-computing elements according to the distribution function.

For example, a distributed storage system may include 10 storage-and-computing elements having 1 GB storage space each, having a total aggregated storage of 10 GB. In order to store 3 contents having a size of 3 GB each, (i) each content is fragmented into a plurality of content fragments, (ii) the content fragments are distributed between the 10 storage-and-computing elements, using a fragment distribution function, and (iii) the content fragments are retrieved by using a fragment retrieving function (which is derived from the fragment distribution function). In the case where the storage space of each storage-and-computing element is in the order of the size of each content to be stored, this embodiment results in a highly efficient usage of the plurality of storage-and-computing elements. This embodiment makes it possible to store large files using storage-and-computing elements having relatively small storage spaces. In one embodiment, users over the Internet allocate a portion of their hard disk for a distributed storage that stores a large amount of content. In another embodiment, a corporate allocates storage portions in a plurality of computers over its Intranet for a distributed storage that stores a large amount of content.

Figure 26:
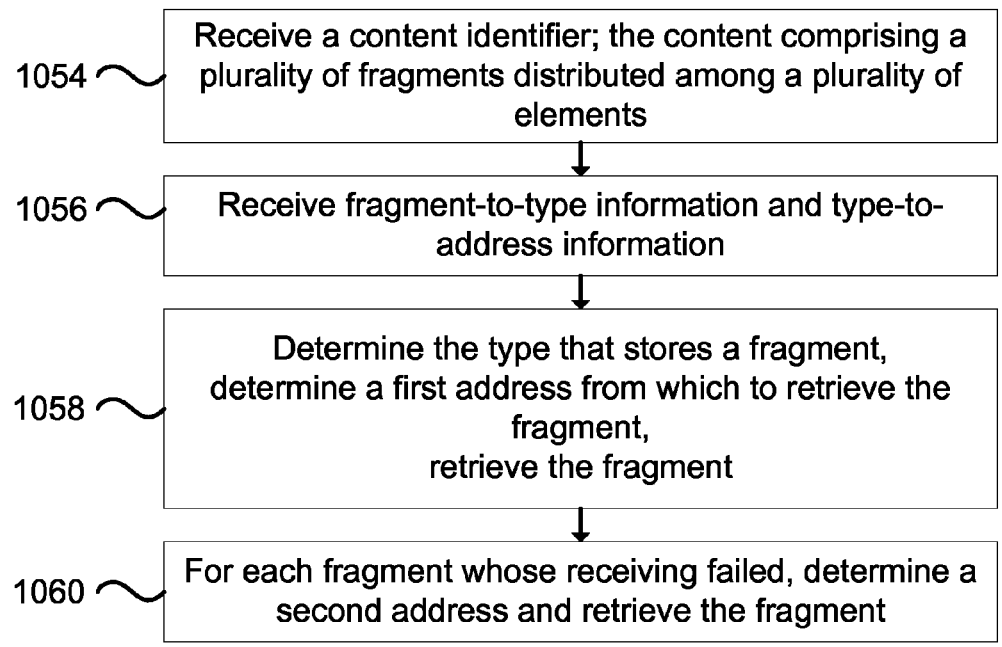

Referring back to the drawings, FIG. 26 illustrates embodiments comprising the following steps:

In step 1054, receiving an identifier of a content to be retrieved; the content comprising a plurality of content fragments distributed among a plurality of storage-and-computing elements; Optionally, the identifier of the content is received from a user interface;

In step 1056, receiving fragment-to-type association information and type-to-physical-address association information associated with the content to be retrieved;

In step 1058, executing the following steps for each content fragment: determining the storage element type that stores the content fragment, using the fragment-to-type association information; determining a first storage-and-computing element physical address from which to retrieve the content fragment, using the type-to-physical-address association information; and retrieving the content fragment from the storage-and-computing element located at the first physical address;

And in step 1060, for each content fragment whose receiving failed, determining a second storage-and-computing element physical address from which to retrieve the content fragment, using the type-to-physical-address association information; and retrieving the content fragment from the storage-and-computing element located at the second physical address.

The aforementioned process may be repeated with other storage-and-computing element physical addresses associated with the storage element type until the fragment is received.

Optionally, the step of determining the physical address from which to retrieve the content fragment is performed on a random basis. In one embodiment of the invention, the step of determining the physical address from the available physical addresses is performed randomly, pseudo randomly, according to at least one predefined criterion, and/or according to another non-consistent method. The selection is non-consistent in order to distribute the load between the different storage-and-computing elements associated with the same storage element type.

Figure 22:
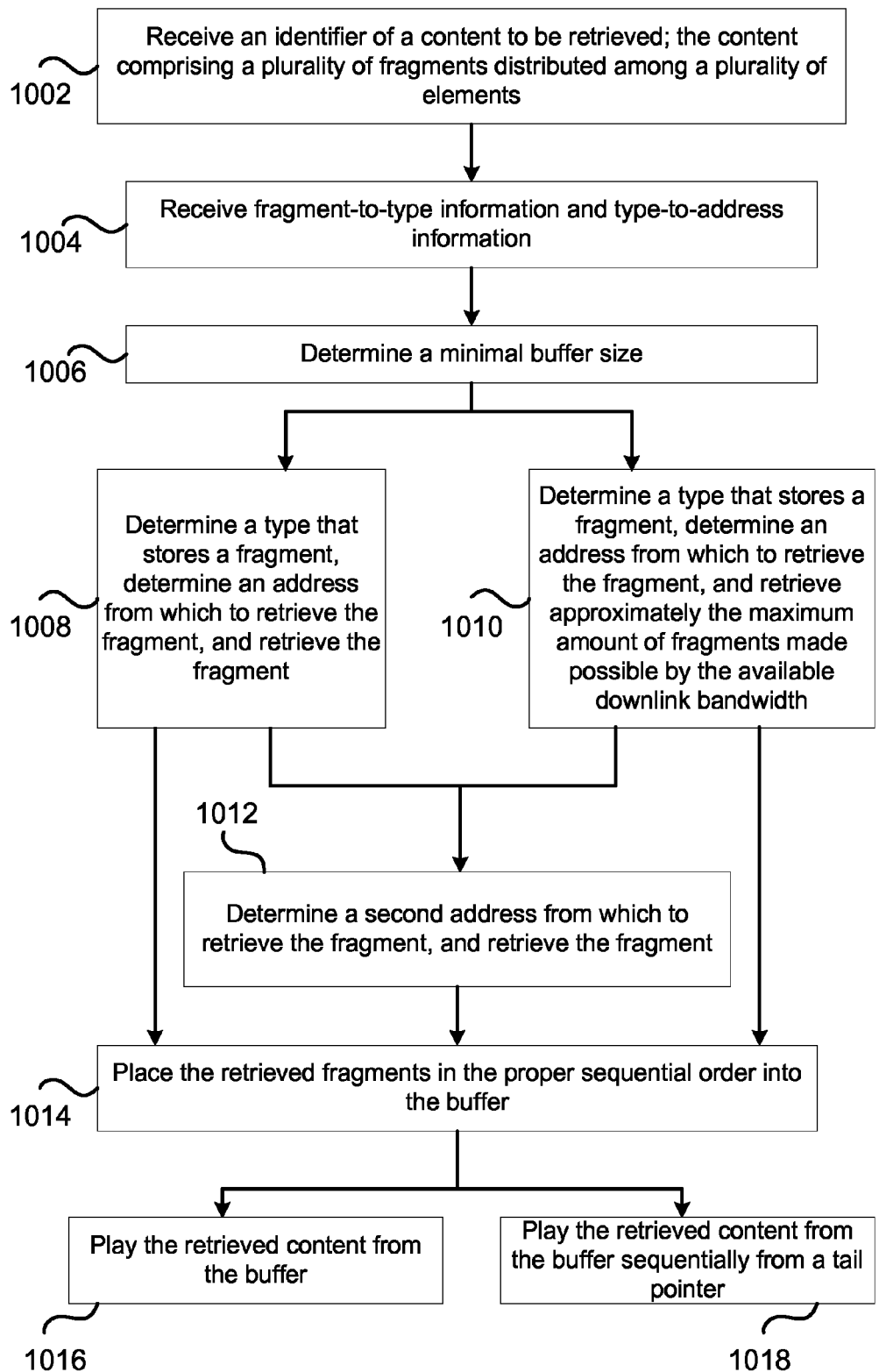
FIGS. 22-33 illustrate methods in accordance with the present invention.

Referring back to the drawings, FIG. 22 illustrates embodiments comprising the following steps:

In step 1002, receiving an identifier of a streaming content to be retrieved; the streaming content comprising a plurality of content fragments distributed among a plurality of storage-and-computing elements;

In step 1004, receiving fragment-to-type association information and type-to-physical-address association information associated with the streaming content to be retrieved;

In step 1006, determining the minimal streaming buffer size that should be retrieved in order to play the streaming content;

In step 1008, executing the following steps for each content fragment to be retrieved: determining the storage element type that stores the content fragment, using the fragment-to-type association information; determining a first storage-and-computing element physical address from which to retrieve the content fragment, using the type-to-physical-address association information; and retrieving the content fragment from the storage-and-computing element located at the first physical address;

And in step 1014, placing the retrieved fragments in the proper sequential order into the streaming buffer.

Optionally, the step of receiving the identifier of the streaming content to be retrieved (1002) further comprises receiving a position within the content to start playing from; and the process of retrieving the content fragments is starting from the content fragment number that is associated with the received position.

Optionally, the step of receiving the identifier of the streaming content to be retrieved (1002) further comprises receiving a content fragment number to start playing from; and the process of retrieving the content fragments is starting from that content fragment number.

Optionally, step 1006 further comprises the step of calculating the number of content fragments comprised within the minimal streaming buffer size by dividing the streaming buffer size by the size of a content fragment. For example, in order to fill a minimum streaming buffer of 1.5 Mbit in 5 seconds before starting to play a 1.5 Mbps MPEG-4 standard definition stream using 8 Kbyte fragments, the calculation is: 1.5 Mbit times 5 seconds equals 7.5 Mbits, which equal 0.9375 MBytes. And therefore the amount of fragments for fast retrieval are 0.9375/0.008=118 fragments.

Optional step 1012 further illustrates, for each content fragment whose retrieving failed, determining a second storage-and-computing element physical address from which to retrieve the content fragment, using the type-to-physical-address association information; and retrieving the content fragment from the storage-and-computing element located at the second physical address.

Optionally, the method of retrieving the content fragment is selected from the group of: partial overlapping retrieval, parallel retrieval, pseudo random selection of the content fragments to be retrieved, and a combination thereof. For example, when utilizing a downlink bandwidth of approximately 5 Mbps for streaming a stream of approximately 1.5 Mbps, approximately 30 concurrent fragment streams, each of approximately 100 Kbps, may be used.

Optionally, in step 1010, the step of retrieving the content fragments comprises retrieving approximately the maximum amount of content fragments made possible by the available downlink bandwidth.

Optionally, the step of determining the storage-and-computing element physical address from which to retrieve the content fragment is performed such as to reduce at least one of the following: operational cost, setup cost, transit fees between ISP operators, network congestion, network congestion at the network aggregation levels.

Optionally, the step of determining the storage-and-computing element physical address from which to retrieve the content fragment is performed such as to reduce the average number of hops in the network when retrieving content fragments by all of the storage-and-computing elements.

Optionally, the embodiments further comprise the step of accessing a network topology map prior to the step of determining the storage-and-computing element physical addresses and utilizing the network topology map when determining the storage-and-computing element physical addresses.

Optionally, the network topology map is calculated using multi peer probing. And optionally, the multi peer probing comprises the steps of: a major amount of the storage-and-computing elements executing Traceroutes to at least one predefined router IP address, and reporting, to a predefined server, about the routers found on the path to the predefined router IP address; and the predefined server locating intersections between the reported paths and according to that deriving the network topology.

Optionally, the embodiments further comprise on going retrieving of content fragments, wherein the rate of the on going retrieving is determined according to the streaming buffer consumption rate.

Optionally, the embodiments further comprise the step 1016 of playing the retrieved streaming content from the streaming buffer. Optionally, the streaming buffer comprises two statuses—content fragments to be played (already retrieved and stored in the buffer) and content fragments that are in the process of being retrieved; and a tail pointer points to the position from which the streaming content is presently played; Optionally, the streaming buffer is a cyclic streaming buffer. The content fragments to be played are content fragments that were already retrieved and are stored in the buffer.

Optionally, the embodiments further comprise retrieving the content fragments that are in the process of being retrieved and fail to be retrieved from an alternative storage-and-computing element, by using the type-to-physical-address association information;

Optionally, the embodiments further comprise retrieving content fragments that fail to be retrieved approximately simultaneously in the order of their closeness to the tail pointer. Such that if several content fragments fail to be retrieved approximately simultaneously, the content fragment that is closest to the tail pointer will be retrieved first and the content fragments that is second closest to the tail pointer will be retrieved second.

Optionally, the embodiments further comprise the step 1018 of playing the retrieved streaming content from the streaming buffer sequentially from the tail pointer.

Optionally, the streaming buffer further stores a portion of already played streaming content for convenient backward jump.

In one embodiment, a distributed storage and retrieval system comprises a plurality of storage-and-computing elements, each storage-and-computing element stores a plurality of pushed content fragments and is able to retrieve other pushed content fragments from at least five other storage-and-computing elements using Internet protocol; the available uplink bandwidth of an average storage-and-computing element ('R' expressed in Kbps) is smaller than a third of the average streaming bit rate; and wherein no more than 'N' storage-and-computing elements, in no later than 'T' seconds from request, are able to play streaming contents, wherein T is shorter than (1000/R) or alternatively 200/R, wherein N is proportional to the available aggregated uplink bandwidth of the storage-and-computing elements divided by an average streaming content bit rate.

Optionally, the plurality of the pushed content fragments are distributed to the storage-and-computing elements according to a distribution function selected from the group of: hash functions, pseudo random sequences, pointers, table based distribution mechanisms, and linear distribution functions.

Optionally, each storage-and-computing element is associated with a storage element type, and the number of storage-and-computing elements is equal to the number of the storage element types, and the plurality of storage-and-computing elements are spanned by one network node, and the network node is selected from the group of: DSLAM, B-RAS, network aggregation node, Edge router, central office node, Network Edge router, Network segment, or a combination thereof.

Optionally, the plurality of the pushed content fragments are distributed according to a distribution function and the distribution function features a low autocorrelation and a low correlation with other distribution functions used by the distributed storage and retrieval system.

Optionally, the plurality of the pushed content fragments are distributed approximately homogeneously between the relevant storage-and-computing elements.

Optionally, the plurality of the pushed content fragments are distributed according to a pseudo random distribution function.

Numeric examples of the above parameters include: (i) R approximately equals 20 Kbps, the stream rate is approximately 1.5 Mbps, the system comprises at least 75 storage-and-computing element types, and T is less than 2 seconds; (ii) R approximately equals 100 Kbps, the stream rate is approximately 1.5 Mbps, the system comprises at least 15 storage-and-computing element types, and T is less than 10 seconds; and (iii) R approximately equals 300 Kbps, the stream rate is approximately 12 Mbps, the system comprises at least 40 storage-and-computing element types, and T is less than 3.3 seconds Optionally, R is calculated by dividing the total available upload bandwidth of the storage-and-computing elements by the number of the storage-and-computing elements. Optionally, R is between $1/10$ and $1/1000$ of the average streaming content bit rate.

Optionally, the total available downlink bandwidth of the storage-and-computing elements is at least three times greater than the total available uplink bandwidth of the storage-and-computing elements.

In one embodiment, only a portion of the uplink and/or downlink bandwidth is available for use by the distributed storage and retrieval system. In that case, the available uplink/downlink bandwidth of an average storage-and-computing element is calculated according to the portion of the uplink/downlink bandwidth that is available for use by the distributed storage and retrieval system.

In one embodiment, a system comprises a plurality of interconnected layer-3 IP routers; each of the layer-3 IP routers spans a plurality of peer nodes; each peer node is associated with one storage element type, whereby the system comprises 'x' storage element types and each peer node pre-stores about 1/x of the contents pre-stored by the peer nodes associated with the storage element types; the peer nodes assemble streaming contents by retrieving fragments stored in peer nodes associated with various storage element types; wherein the greater the amount of peer nodes spanned by each layer-3 IP router, the less traffic there is between layer-3 IP routers; and wherein no peer node is required to change its pre-stored content during the process of adding new peer nodes to the system.

Optionally, each peer node first attempts to retrieve fragments from other peer nodes spanned by its layer-3 IP router, and for each peer node that is not available or congested, a peer node spanned by another layer-3 IP router is selected.

In one embodiment, a system comprises a plurality of interconnected layer-3 IP routers; each of the layer-3 IP routers spans a predefined number 'x' of peer nodes; each peer node pre-stores approximately 1/x of the contents pre-stored in the peer nodes spanned by the same layer-3 IP router; the peer nodes assemble streaming contents stored in the peer nodes spanned by the layer-3 IP routers by retrieving fragments from neighboring peer nodes; wherein the greater the amount of peer nodes spanned by each layer-3 IP router, the less traffic there is between layer-3 IP routers; and wherein no peer node is required to change its pre-stored content during the process of adding new peer nodes to the system.

The term "plurality of interconnected layer-3 IP routers" as used in the claims includes a case wherein every two layer-3 IP routers have a direct or indirect connecting path between them.

Optionally, each streaming content stored in the system is between 100 MB and 8 GB, and between 500 and 20,000 different streaming contents are stored in the system. Optionally, x is between 50 and 2000, and each peer node stores between 200 MB and 10 GB of content.

Optionally, the aggregated streaming content consumption rate by the peer nodes is roughly two orders of magnitude larger than the aggregated backbone traffic when the layer-3 IP routers span between 10,000 and 1,000,000 peer nodes.

Optionally, the streaming content is playable within 5 seconds of being requested.

In one embodiment, a peer-to-peer system comprises: (i) a first group of peer clients able to communicate with each other using Internet protocol and all comprising roughly similar storage and communication characteristics;

(ii) a second group of peer clients storing a plurality of small content fragments, whereby the second group of peer clients is a sub group of the first group of peer clients and the second group is not significantly smaller than the first group; and (iii) a third group of peer clients, capable of retrieving content fragments from the second group of peer clients and assembling the retrieved content fragments to streaming content; the third group of peer clients is a sub group of the first group of peer clients, and the size of the third group of peer clients is proportional to the average available aggregated uplink divided by an average streaming content bit rate;

wherein the backbone traffic associated with the peer-to-peer system is significantly smaller than the aggregated streaming content consumption rate by the peer nodes of the peer-to-peer system Optionally, each of the peer clients of the second group of peer clients has a storage space ranging between 64 KB and 20 GB. Optionally, the size of each small content fragment is between 1 KB and 32 KB.

Optionally, the plurality of the small content fragments are distributed among the second group of peer clients using a distribution function selected from the group of: hash functions, pseudo random sequences, pointers, table based distribution mechanisms, and linear distribution functions. Optionally, the small content fragments are distributed approximately homogeneously between the second group of peer clients.

Optionally, the plurality of the small content fragments are distributed among the second group of peer clients using a pseudo random distribution function having a low autocorrelation and a low correlation with other pseudo random distribution functions used by the peer-to-peer system.

Optionally, each peer client of the third group of peer clients is able to assemble the streaming content within 'T' seconds from requesting it, wherein T is shorter than (1000/R) and R is the average uplink bandwidth of a peer client belonging to the second group of peer clients (expressed in Kbps).

Optionally, the available uplink bandwidth of an average peer client is smaller than a third of the average streaming content bit rate.

Optionally, the volume of the small content fragments stored in each peer client and the volume of an average streaming content stored in the P2P system are roughly of a similar order of magnitude.

Optionally, the volume of the small content fragments stored in each peer client ranges between 100 KB and 20 GB. Optionally, the peer clients of the second group comprise FLASH memory for storing the small content fragments.

Figure 29:
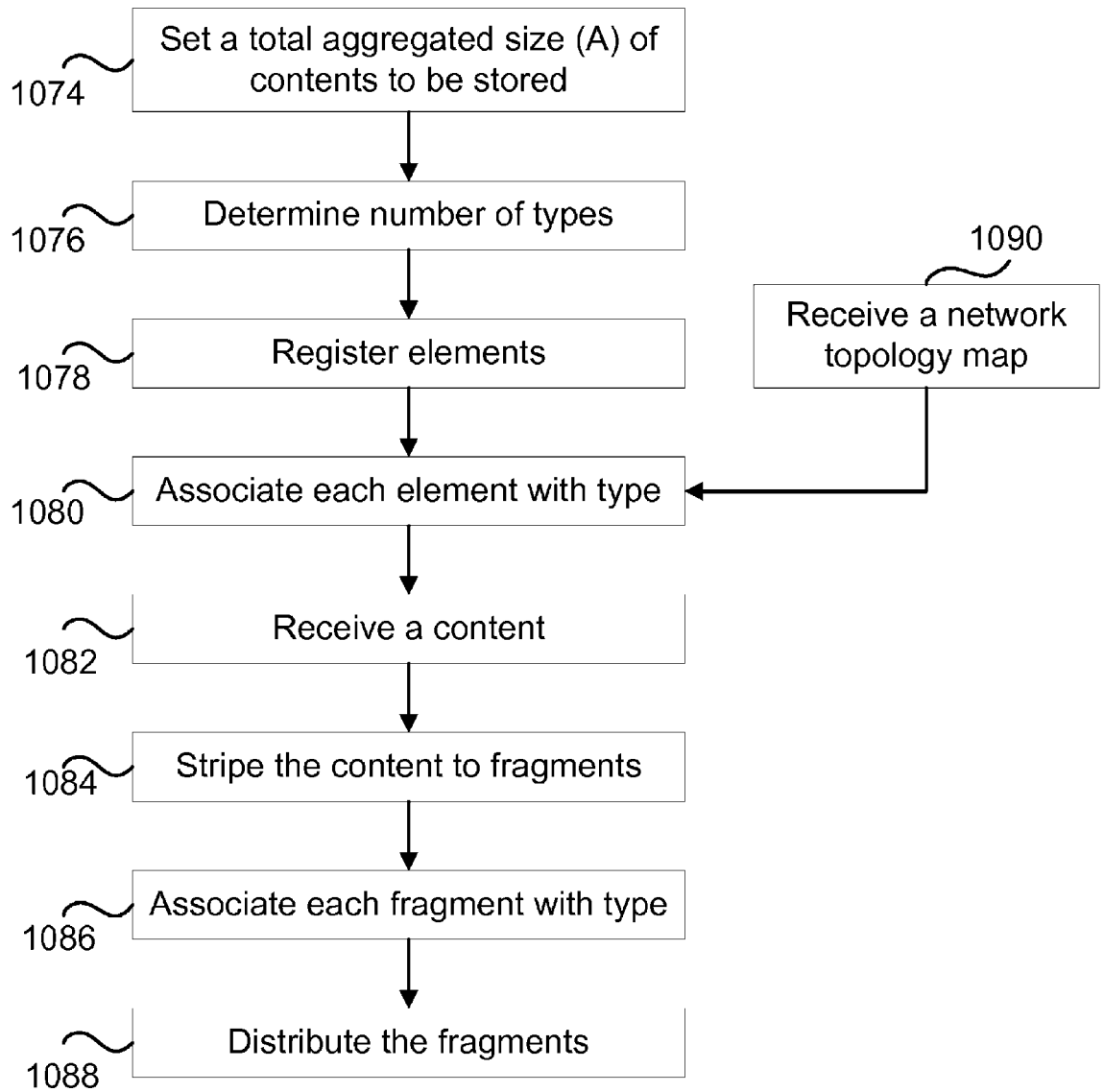

Referring back to the drawings, FIG. 29 illustrates embodiments comprising the following steps:

In step 1074, setting a total aggregated size (A) of all contents to be stored in a cluster that comprises a plurality of storage-and-computing elements, each storage-and-computing element comprising a minimal available storage (MAS) and communicating using Internet protocol;

It is to be understood that the total aggregated size (A) of all contents to be stored includes any overhead as a result of fragmenting the content or any other action in any of the embodiments of the invention. If a storage-and-computing element does not have the minimal available storage, it is not considered as an available storage-and-computing element. Optionally, each storage-and-computing element reports its available storage.

In step 1076, determining a number of storage element types (N), wherein N>=20; Optionally, all storage-and-computing elements associated with the same storage element type comprise the same content fragments. In one embodiment, the number of required storage element types (N) is calculated by a ceiling function of (A/MAS).

In step 1078, registering M available storage-and-computing elements, wherein M>=N; Optionally, the embodiments further comprise the step 1090 of receiving a network topology map that describes the connectivity paths between the M available storage-and-computing elements.

In step 1080, associating each of the M storage-and-computing elements with at least one of the N storage element types, whereby the number of storage-and-computing elements associated with each storage element type is approximately the same; Optionally, predefined storage element types have more storage-and-computing elements. The predefined storage element types may hold specific information such as key frames, highly consumed content sections, etc. For example, a cluster of 100,000 storage-and-computing elements with an average of 100 storage-and-computing elements per type includes approximately 1000 storage element types.

In step 1082, receiving a content having a size greater than a predefined size to be stored in the distributed storage system; Optionally, the predefined size is a function of the available storage space in each of the storage-and-computing elements.

In step 1084, fragmenting the content into a plurality of content fragments, each sized no more than 64 KB;

In step 1086, associating each of the content fragments with at least one storage element type, according to a fragment-to-type association information;

And in step 1088, distributing the content fragments to the storage-and-computing elements according to type-to-physical-address association information.

Optionally, the minimal available storage of each of the storage-and-computing elements may be dynamically changed within a predefined range.

Figure 30:
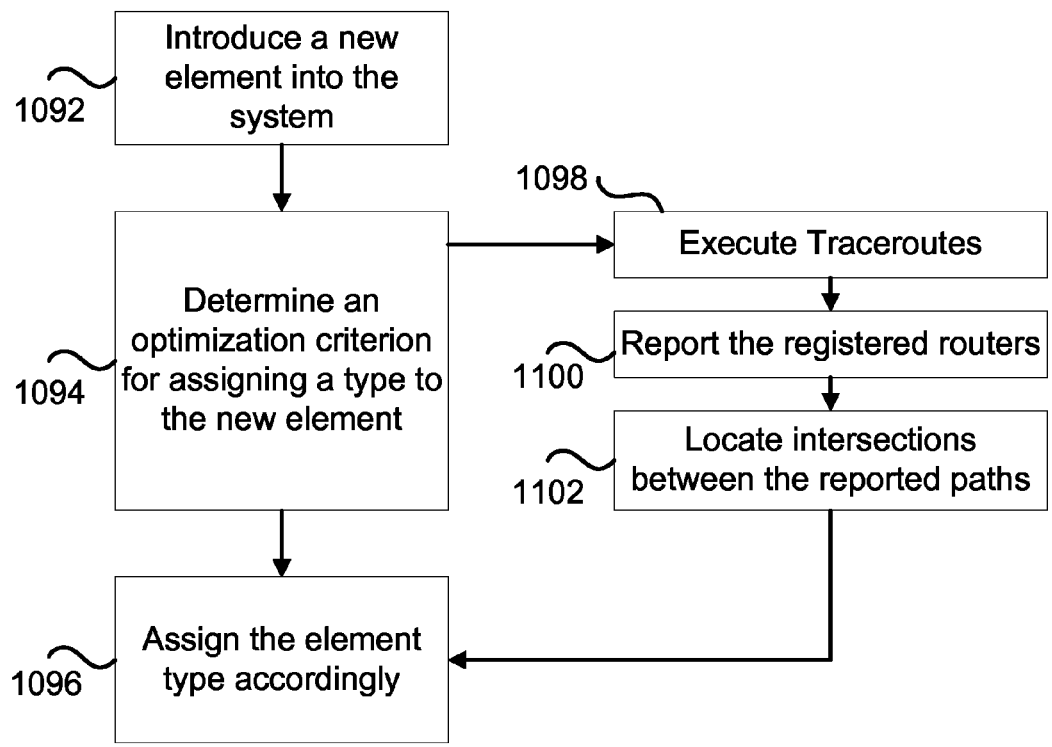

Referring back to the drawings, FIG. 30 illustrates embodiments comprising the following steps: In step 1092, introducing a new storage-and-computing element into a distributed storage system at a specific IP address, wherein the distributed storage system comprises a plurality of storage-and-computing elements, and each storage-and-computing element stores a plurality of content fragments and is able to retrieve other stored content fragments from other storage-and-computing elements using Internet protocol; In step 1094, determining an optimization criterion for assigning a storage element type to the new storage-and-computing element; And in step 1096, assigning the new storage-and-computing element a storage element type such that the optimization criterion is minimized.

Optionally, the optimization criterion for assigning the storage element type to the new storage-and-computing element reduces the variance of the number of storage-and-computing elements per storage element types over the entire storage element types space.

Optionally, the optimization criterion for assigning the storage element type to the new storage-and-computing element reduces at least one of the following: operational cost, setup cost, transit fees between ISP operators, network congestion, and network congestion at the network aggregation levels.

Optionally, the optimization criterion for assigning the storage element type to the new storage-and-computing element reduces the average number of hops in the network while the storage-and-computing elements retrieve data. And optionally, the embodiments further comprise the step of utilizing a topology map prior to the step of introducing the new storage-and-computing element into the distributed storage system.

Optional steps 1098, 1100, 1102 further illustrate creating the topology map, which may comprise: a major amount of the storage-and-computing elements executing Traceroutes to at least one predefined router IP address (1098), and reporting (1100), to a predefined server, about the routers found on the path to the predefined router IP address; and the predefined server locating intersections between the reported paths and according to that deriving the network topology (1102).

Optionally, the optimization criterion for assigning the storage element type to the new storage-and-computing element is utilizing a topology map for minimizing the aggregated hop count of the retrieving storage-and-computing elements.

For example, a cluster of 100,000 storage-and-computing elements with 1000 storage element types has an average of 100 storage-and-computing elements per type. The physical addresses of the 100 storage-and-computing elements associated with each type are sorted by the number of hops (referred to as the hop count) from the retrieving storage-and-computing element. The storage-and-computing element having the minimal hop count will be accessed.

Optionally, the optimization criterion for assigning the storage element type to the new storage-and-computing element is balancing the local storage-and-computing elements per type.

Optionally, the embodiments further comprise the steps of: determining at least two sub groups of all participating storage-and-computing elements; and assigning the new storage-and-computing element to one of the sub groups so as to balance the storage-and-computing elements per type assigned to that sub group. Optionally, each sub group includes all participating storage-and-computing elements connected to the same ISP router.

Optionally, the optimization criterion for assigning the storage element type to the new storage-and-computing element is minimizing transit fees between ISP operators by matching each storage-and-computing element to an ISP's domain prior to adding the new storage-and-computing element, whereby the storage element type selected for the new storage-and-computing element minimizes the aggregated inter ISPs transit traffic volume. Optionally, the aggregated inter ISPs transit traffic volume is derived from a matching between each storage-and-computing element to an ISP domain.

Some embodiments may comprise retrieving an amount of content fragments that fills a minimal streaming buffer size required for playing a streaming content, using approximately the maximum available downlink bandwidth; wherein retrieving the content fragments comprises, for each content fragment: determining the storage element type that stores the content fragment, using fragment-to-type association information; determining a first storage-and-computing element physical address from which to retrieve the content fragment, using type-to-physical-address association information; and retrieving the content fragment from the storage-and-computing element located at the first physical address; And wherein the content fragments are stored in a distributed storage and retrieval system comprising a plurality of storage-and-computing elements, each storage-and-computing element stores a plurality of content fragments and is able to retrieve other stored content fragments from other storage-and-computing elements using Internet protocol;

Optionally, the embodiments further comprise, for each content fragment whose retrieving failed, determining a second storage-and-computing element physical address from which to retrieve the content fragment, using the type-to-physical-address association information; and retrieving the content fragment from the storage-and-computing element located at the second physical address. Optionally, the step of determining the second storage-and-computing element physical address is executed according to a locality cost function.

Optionally, the embodiments further comprise the step of receiving a content fragment identifier to jump to and retrieve content fragments from, prior to the step of retrieving the amount of content fragments, whereby the amount of content fragments are retrieved in sequential order from the received content fragment identifier.

Optionally, the embodiments further comprise receiving an identifier of the streaming content to be retrieved prior to the step of retrieving the amount of content fragments.

Optionally, the embodiments further comprise the step of determining the minimal streaming buffer size according to the characteristics of the network. Optionally, the amount of content fragments that fills the minimal streaming buffer size is calculated approximately by dividing the minimal streaming buffer size by the size of a content fragment.

Optionally, the embodiments further comprise on going retrieving of content fragments, wherein the rate of the on going retrieving is determined according to the streaming buffer consumption rate.

In one embodiment, a distributed storage system comprises a plurality of storage-and-computing elements, each storing a plurality of content fragments, wherein a streaming content retrieval load is shared between the storage-and-computing elements such that approximately the total bandwidth of the distributed storage system can be utilized by any combination of multiple storage-and-computing elements simultaneously retrieving many streaming contents or retrieving the same streaming content with different time shifts.

Optionally, each streaming content is associated with a different fragment distribution information and the plurality of content fragments are distributed according to the fragment distribution information, and each of the fragment distribution information features a low autocorrelation and a low correlation with the other fragment distribution information.

Optionally, each of the fragment distribution information comprises at least one of the following: hash functions, pseudo random sequences, pointers, table based distribution mechanisms, and linear distribution functions.

In one embodiment, a distributed storage and retrieval system comprises a plurality of storage-and-computing elements, each storage-and-computing element stores a plurality of content fragments according to fragment distribution information featuring a low autocorrelation, and is able to retrieve other stored content fragments from other storage-and-computing elements using Internet protocol; the content fragments are associated with a plurality of streaming contents; And a maximum number of storage-and-computing elements are able to retrieve multiple streaming contents concurrently, whereby the multiple streaming contents may be time shifted; wherein the maximum number of storage-and-computing elements that are able to retrieve the multiple streaming contents approaches the aggregated uplink throughput of all participating storage-and-computing elements divided by the aggregated bitrate of the streams retrieved by the storage-and-computing elements.

In general, as the autocorrelation is lower, the distributed storage system may provide better performances. The low autocorrelation assures that the various retrieving storage-and-computing elements are referred to different storage-and-computing elements and therefore the load is spread across the storage-and-computing elements approximately uniformly.

Optionally, the aggregated uplink throughput of all the participating storage-and-computing elements is calculated dynamically according to the current state of the distributed storage and retrieval system.

Optionally, the maximum number of storage-and-computing elements that are able to retrieve the multiple streaming contents is almost independent of what streaming contents are retrieved by the storage-and-computing elements. And optionally, the maximum number of storage-and-computing elements that are able to retrieve the multiple streaming contents is almost independent of the number of storage-and-computing elements retrieving the same streaming contents.

Figure 31:
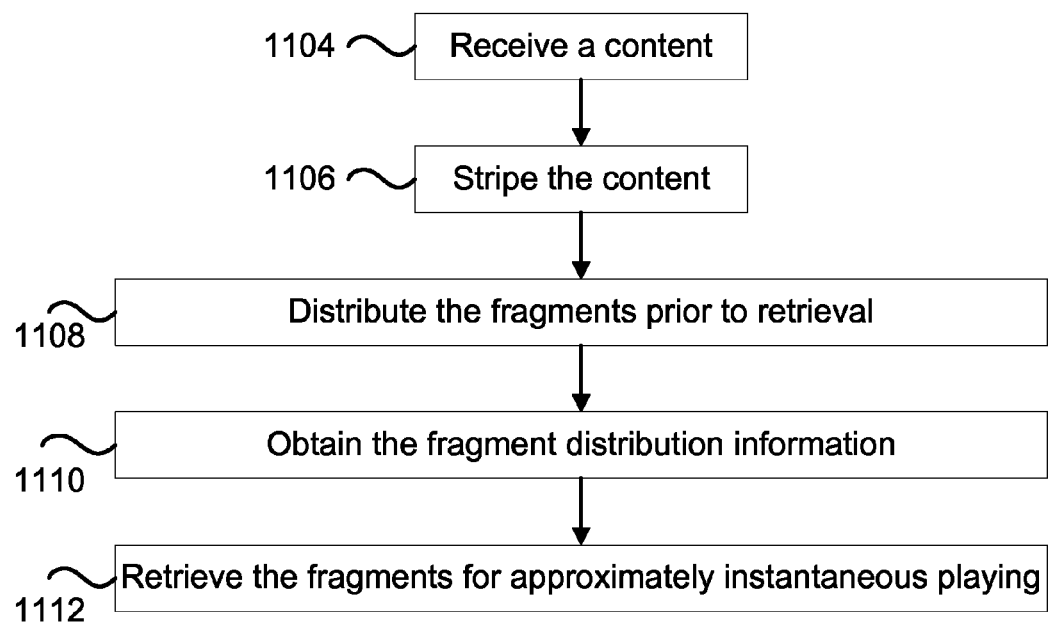

Referring back to the drawings, FIG. 31 illustrates embodiments comprising the following steps: In step 1104, receiving a content to be streamed or progressively downloaded; In step 1106, striping the content into small content fragments; In step 1108, distributing the content fragments to storage-and-computing elements according to a fragment distribution information, and prior to any retrieval of the content fragments from the storage-and-computing elements; In step 1110, obtaining the fragment distribution information, whereby the fragment distribution information is obtained by the retrieving storage-and-computing element; And in step 1112, retrieving the content fragments for approximately instantaneous playing of the streaming content by utilizing the fragment distribution information for calculating the appropriate storage element types and transforming the storage element type to storage-and-computing element physical addresses.

Optionally, each storage-and-computing element is associated with at least one storing element type and the fragment distribution information comprises fragment-to-type association information and type-to-physical-address association information.

Optionally, the embodiments further comprise the step of receiving, by the storage-and-computing element, a request to retrieve the content prior to the step of obtaining the fragment distribution information.

Figure 32:
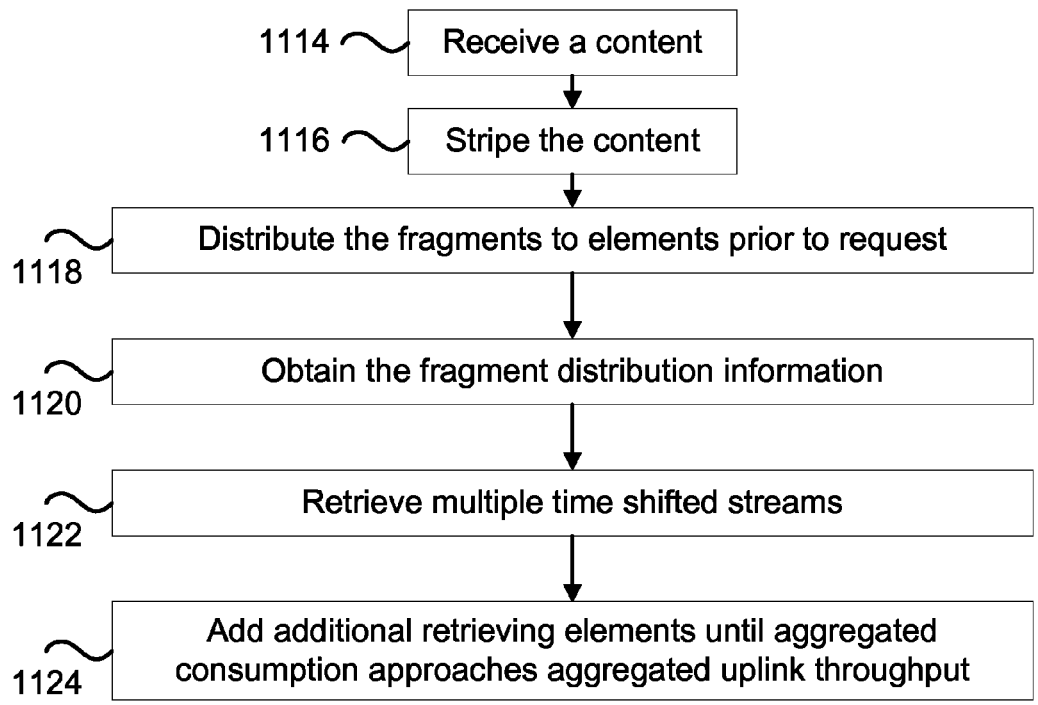

Referring back to the drawings, FIG. 32 illustrates embodiments comprising the following steps: In step 1114, receiving a first content to be streamed or progressively downloaded; In step 1116, striping the first content into small first content fragments; In step 1118, distributing the first content fragments to storage-and-computing elements according to a first fragment distribution information, and prior to any request from any storage-and-computing element to retrieve the first content;

In step 1120, obtaining the first fragment distribution information associated with the first content by a first group of storage-and-computing elements, whereby each of the first storage-and-computing elements obtains the first fragment distribution information independently and uncorrelated in time with the other storage-and-computing elements, and wherein the first fragment distribution information features a low autocorrelation;

In step 1122, retrieving the first content fragments by the first group of assembling storage-and-computing elements according to the first fragment distribution information, wherein approximately all retrieved streams are time shifted in relation to one another;

And in step 1124, adding additional retrieving storage-and-computing elements until the aggregated throughput of the streams consumed by all the storage-and-computing elements approaches the aggregated uplink throughput of all participating storage-and-computing elements.

Optionally, multiple fragment distribution information which describe multiple redundant distributions are used per single content.

Optionally, the embodiments further comprise the steps of: receiving a second content to be streamed or progressively downloaded; striping the second content into small second content fragments; distributing the second content fragments to storage-and-computing elements according to a second fragment distribution information, and prior to any request from any storage-and-computing element to retrieve the second content; obtaining the second fragment distribution information associated with the second content by a second group of storage-and-computing elements, whereby each of the second group of storage-and-computing elements obtains the second fragment distribution information independently and uncorrelated in time with the other storage-and-computing elements, and wherein the second fragment distribution information features a low autocorrelation; and retrieving the second content fragments by the second group of assembling storage-and-computing elements according to the second fragment distribution information, wherein approximately all retrieved streams are time shifted in relation to one another.

Optionally, the first and the second fragment distribution information are the same, and/or have approximately zero correlation, and/or feature low autocorrelation and low correlation, and/or are distributed approximately homogeneously between the storage-and-computing elements, and/or are selected from the group of: hash functions, pseudo random sequences, pointers, table based distribution mechanisms, and linear distribution functions.

Figure 33:
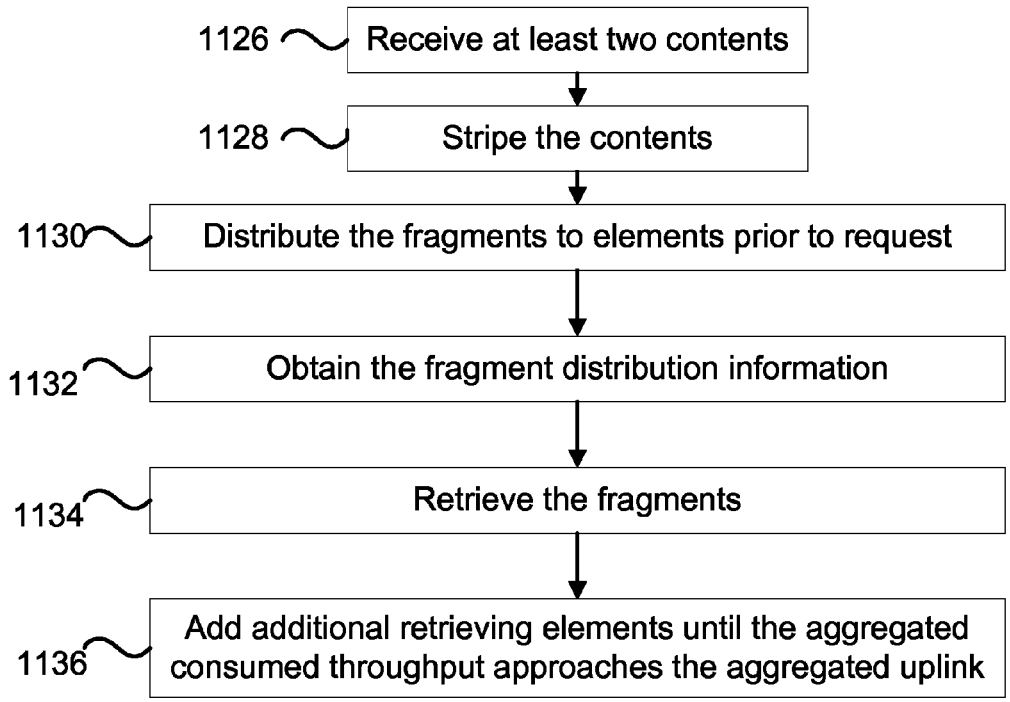

Referring back to the drawings, FIG. 33 illustrates embodiments comprising the following steps: In step 1126, receiving at least two contents to be streamed or progressively downloaded; In step 1128, striping the contents into small content fragments;

In step 1130, distributing the content fragments to storage-and-computing elements according to their corresponding fragment distribution information, and prior to any request from any storage-and-computing element to retrieve one or more of the contents; and wherein the fragment distribution information features low autocorrelation, and low correlation with other fragment distribution information used by the distributed storage system;

In step 1132, obtaining the fragment distribution information by a plurality of assembling storage-and-computing elements, whereby each storage-and-computing element obtains the fragment distribution information independently and uncorrelated in time with the other storage-and-computing elements;

In step 1134, retrieving the fragments according to the fragment distribution information by a plurality of assembling storage-and-computing elements, wherein some of the retrieved streams are of the same content and are time shifted in relation to one another, and some of the streams are of different contents;

And in step 1136, adding additional retrieving storage-and-computing elements, until the aggregated throughput of the streams consumed by all the storage-and-computing elements approaches the aggregated uplink throughput of all participating storage-and-computing elements, regardless of the mixture of the selected contents and their time shifts.

In one embodiment, the correlations between the different fragment distribution information related to different contents are low, regardless of the time shifts between the different contents. As a result, a large amount of contents may be retrieved, wherein any content may feature almost any required time shifts, and still the uplink bandwidth is highly utilized.

In one embodiment, an interactive content stored in and retrieved by a distributed storage and retrieval system, comprises:

(i) a plurality of content sections; each content section comprising a plurality of content fragments; whereby the content sections are, at least partially, operated by a user. For example, the user may select the order of playing the content sections and/or interact with the interactive content and by that influence the order of the supplied content sections.

(ii) instructions for combining the content sections. Optionally, the instructions for combining the content sections depend on previous selections, previous selections of a user's sub-group, previous selections of users that are physically close to the receiving user.

For example, a plurality of users living in a certain neighborhood may want to be presented with the same selections of an interactive movie and/or view an interactive content in the same order or in a specifically different order from their neighbors or a group in which they take part. The user's physical location may be derived from any appropriate means, such as, but not limited to, the network topology, identifiable networks, prior data, and available data.

Optionally, the instructions for combining the content sections depend on the status of the distributed storage and retrieval system.

For example, if a specific content section is not available in the distributed storage and retrieval system, the specific content section will not be introduced to the user. A content section may also not be available because of network congestion reasons.

Optionally, the instructions for combining the content sections are associated with advertisement content sections. For example, a user may be provided with an interactive content section only after watching an advertisement.

(iii) instructions for distributing the content fragments between a plurality of storage-and-computing elements.

Optionally, the distributed storage and retrieval system comprises a plurality of storage-and-computing elements, each storage-and-computing element stores a plurality of pushed content fragments and is able to retrieve other pushed content fragments from at least five other storage-and-computing elements using Internet protocol;

Optionally, the interactive content further comprises instructions for retrieving required content sections from the plurality of storage-and-computing elements.

In one embodiment of the invention, mega high consumption of a plurality of streaming contents is supplied by the distributed storage and retrieval system having hundreds of thousands of storage-and-computing elements. The following is an example of an event that will require such a mega high consumption. It is expected that in the year 2016 the next generation of humanity will be created by 10,000 people that will coherently focus their cosmic energy to form a double sided energy funnel. An energetic body will be created at the waist of the double sided energy funnel and a soul, equivalent to 10,000 human souls, will be poured into the energetic body from the infinite universal soul reservoir. The next generation entity will have an energetic body and will therefore be able to move energy routes from one place to another and create things from cosmic energy similarly to the way a human having a physical body is able to create things from physical materials.

Although the embodiments of the present invention have been described in considerable detail with reference to certain embodiments thereof, other embodiments are possible. Therefore, the spirit and scope of the appended claims should not be limited to the description of the embodiments contained herein.

It is appreciated that certain features of the embodiments, which are, for clarity, described in the context of separate embodiments, may also be provided in various combinations in a single embodiment. Conversely, various features of the embodiments, which are, for brevity, described in the context of a single embodiment, may also be provided separately or in any suitable sub-combination.

It is to be understood that the embodiments are not limited in their applications to the details of the order or sequence of steps of operation or implementation of the systems and methods set in the description, drawings, or examples.

While the methods disclosed herein have been described and shown with reference to particular steps performed in a particular order, it will be understood that these steps may be combined, sub-divided, or reordered to form an equivalent method without departing from the teachings of the embodiments of the present invention. Accordingly, unless specifically indicated herein, the order and grouping of the steps is not a limitation of the embodiments of the present invention.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

Any element in a claim that does not explicitly state "means for" performing a specific function, or "step for" performing a specific function, is not to be interpreted as a "means" or "step" clause as specified in 35 U.S.C. §112, ¶6.

What is claimed is:

1. A method comprising: setting first and second storage groups according to a required storage redundancy, wherein each storage group is spanned by one network node selected from the group of: DSLAM, B-RAS, IP services switch, IP services router, or a combination thereof;
registering a plurality of peer-to-peer devices;
associating the peer-to-peer devices with at least one of the first and second storage groups, such that aggregate allocated storage space of the peer-to-peer devices associated with each of the first and second storage groups comprises total size of contents to be stored;
receiving a first content to be stored in the first and second storage groups;
fragmenting the first content into a plurality of first content fragments having small size; and
distributing the first content fragments essentially homogeneously between the peer-to-peer devices associated with each of the first and second storage groups according to a first distribution function associated with each storage group such that fragments that are inaccessible via one of the network nodes spanning the first storage group, are still accessible via another network node spanning the second storage group.

2. The method of claim 1, further comprising retrieving the first content fragments based on the first distribution function, and wherein each storage group is spanned by one network node.

3. The method of claim 2, wherein the size of the first content is larger than 100 MB, and the first content fragments having an average size of up to 128 KB.

4. The method of claim 2, wherein there is no need to run a content fragment search mechanism for determining which peer-to-peer devices store which content fragments.

5. The method of claim 2, further comprising receiving a second content having a large size; fragmenting the second content into a plurality of second content fragments having an average size of up to 128 KB; and distributing the second content fragments between the peer-to-peer devices associated with each storage group according to a second distribution function associated with each storage group.

6. The method of claim 5, wherein the first and second distribution functions feature low autocorrelation and low correlation.

7. The method of claim 5, wherein the first and the second distribution functions distribute the content fragments essentially homogeneously between the relevant peer-to-peer devices.

8. The method of claim 5, wherein the first and the second distribution functions are pseudo random sequences generated with primitive polynomials.

9. A system comprising:
a plurality of peer-to-peer devices accessed using Internet protocol, the peer-to-peer devices associated with first and second storage groups, wherein each of the first and second groups is spanned by one network node selected from the group of: DSLAM, B-RAS, IP services switch, IP services router, or a combination thereof;
a computer configured to receive and fragment a content into more than 10,000 content fragments; and
a hash function for a priori distribution of the content fragments between the peer-to-peer devices associated with each of the first and second storage groups, wherein the content fragments are essentially homogeneously distributed between the peer-to-peer devices, such that fragments that are inaccessible via one of the network nodes spanning the first storage group, are still accessible via another network node spanning the second storage group.

10. The system of claim 9, further comprising means for implementing a trick play based on the a priori distribution of the content fragments.

11. The system of claim 10, wherein each peer-to-peer device allocates memory space ranging between 100 KB and 20 GB, and average content fragment size is between 1 KB and 64 KB and a majority of the content fragments are essentially the same size.

12. The system of claim 10, wherein each storage group is spanned by one network node, and the network node is selected from the group of: DSLAM, B-RAS, IP services switch, IP services router, or a combination thereof.

13. The system of claim 10, wherein size of each of the content fragments essentially equals minimal size of a payload that is efficiently transmitted between the peer-to-peer devices.

14. A method comprising:
introducing a new storage-and-computing element into a distributed storage system at a specific IP address, wherein the distributed storage system comprises a plurality of storage-and-computing elements associated with storage element types and capable of retrieving stored content fragments from other storage-and-computing elements utilizing Internet protocol; wherein the storage element types set associations to partitions of content fragments, and storage-and-computing elements associated with the same storage element type store substantially the same content fragments;

determining an optimization criterion for assigning a storage element type to the new storage-and-computing element; and assigning the new storage-and-computing element a storage element type such that the optimization criterion is minimized.

15. The method of claim 14, further comprising a priori storing in the new storage-and-computing element the content fragments matching its storage element type.

16. The method of claim 15, wherein the optimization criterion for assigning the storage element type to the new storage-and-computing element reduces variance of number of storage-and-computing elements per storage element type over the entire storage element types space.

17. The method of claim 15, wherein the optimization criterion for assigning the storage element type to the new storage-and-computing element reduces at least one of the following: operational cost, setup cost, or transit fees between ISP operators.

18. The method of claim 14, wherein the optimization criterion for assigning the storage element type to the new storage-and-computing element reduces average number of hops in the distributed storage system while the storage-and-computing elements retrieve the content fragments.

19. The method of claim 18, further comprising utilizing a topology map for reducing the average number of hops.

20. The method of claim 19, further comprising calculating the topology map comprising the steps of: executing Traceroutes from a predefined number of the storage-and-computing elements to at least one predefined router IP address, and reporting, to a predefined server, about the routers found on path to the predefined router IP address; locating intersections between the reported paths; and deriving the topology map.

21. The method of claim 14, wherein the optimization criterion for assigning the storage element type to the new storage-and-computing element balances the local storage-and-computing elements per type.

22. The method of claim 21, further comprising the steps of: determining at least two sub groups of all participating storage-and-computing elements; and assigning the new storage-and-computing element to one of the sub groups so as to balance the number of storage-and-computing elements per type assigned to that sub group.

23. The method of claim 22, wherein each sub group includes all participating storage-and-computing elements connected to the same ISP router.

24. The method of claim 14, wherein the optimization criterion for assigning the storage element type to the new storage-and-computing element minimizes transit fees between ISP operators by matching each storage-and-computing element to an ISP's domain prior to adding the new storage-and-computing element, whereby the storage element type selected for the new storage-and-computing element minimizes aggregated inter ISPs transit traffic volume.

* * * * *